(12) United States Patent
Hamm et al.

(10) Patent No.: US 10,214,651 B2
(45) Date of Patent: Feb. 26, 2019

(54) PIGMENT/FRIT MIXTURES

(71) Applicant: MERCK PATENT GMBH, Darmstadt (DE)

(72) Inventors: Lukas Hamm, Otzberg (DE); Carsten Handrosch, Ober-Ramstadt (DE); Nicole Nelischer, Gross-Bieberau (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/282,061

(22) Filed: Sep. 30, 2016

(65) Prior Publication Data

US 2017/0107379 A1    Apr. 20, 2017

(30) Foreign Application Priority Data

Oct. 19, 2015    (DE) .................. 10 2015 013 400

(51) Int. Cl.
| | |
|---|---|
| *C09D 5/03* | (2006.01) |
| *C04B 41/00* | (2006.01) |
| *C04B 41/50* | (2006.01) |
| *C09D 1/00* | (2006.01) |
| *C09D 5/36* | (2006.01) |
| *C04B 41/86* | (2006.01) |
| *C03C 8/14* | (2006.01) |
| *C03C 17/22* | (2006.01) |

(Continued)

(52) U.S. Cl.
CPC .............. *C09D 5/031* (2013.01); *C03C 8/14* (2013.01); *C03C 17/22* (2013.01); *C04B 41/009* (2013.01); *C04B 41/0072* (2013.01); *C04B 41/5022* (2013.01); *C04B 41/5031* (2013.01); *C04B 41/5035* (2013.01); *C04B 41/86* (2013.01); *C09C 1/0021* (2013.01); *C09C 1/0051* (2013.01); *C09D 1/00* (2013.01); *C09D 5/032* (2013.01); *C09D 5/035* (2013.01); *C09D 5/36* (2013.01); *C04B 2103/54* (2013.01); *C09C 2200/102* (2013.01); *C09C 2200/1004* (2013.01); *C09C 2200/1087* (2013.01)

(58) Field of Classification Search
CPC .. C03C 8/14; C04B 41/86; C09D 1/00; C09D 5/031; C09D 5/032; C09D 5/035; C09D 5/36

See application file for complete search history.

(56) References Cited

U.S. PATENT DOCUMENTS

| | | | |
|---|---|---|---|
| 5,364,467 A * | 11/1994 | Schmid ................ | C09C 1/0015 106/403 |
| 5,607,504 A * | 3/1997 | Schmid ................ | A61K 8/11 106/403 |

(Continued)

FOREIGN PATENT DOCUMENTS

| | | |
|---|---|---|
| CN | 101462895 A | 6/2009 |
| EP | 0419843 A1 | 4/1991 |

OTHER PUBLICATIONS

Search Report for Related European Patent Application No. 16002113 dated Feb. 14, 2017.

(Continued)

*Primary Examiner* — Veronica F Faison
(74) *Attorney, Agent, or Firm* — Millen White Zelano and Branigan, PC; John Sopp

(57) ABSTRACT

Frits or frit mixtures with pearlescent pigments for materials, such as ceramic glazes, which are stable above 1000° C.

19 Claims, 2 Drawing Sheets

(51) Int. Cl.
  *C09C 1/00* (2006.01)
  *C04B 103/54* (2006.01)

(56) References Cited

U.S. PATENT DOCUMENTS

| | | | | |
|---|---|---|---|---|
| 5,783,506 | A | 7/1998 | Eppler et al. | |
| 6,280,520 | B1* | 8/2001 | Andes | C09C 1/0015 |
| | | | | 106/415 |
| 7,462,230 | B2* | 12/2008 | Balazs | B41M 7/00 |
| | | | | 106/31.6 |
| 7,763,557 | B2 | 7/2010 | Baldwin et al. | |
| 9,102,843 | B2* | 8/2015 | Shipway | C09D 11/322 |
| 2007/0265154 | A1* | 11/2007 | Baldwin | C03C 8/04 |
| | | | | 501/16 |
| 2008/0210122 | A1* | 9/2008 | Magdassi | B41J 3/28 |
| | | | | 106/31.05 |
| 2011/0129679 | A1* | 6/2011 | Svetlana | C03C 8/12 |
| | | | | 428/433 |
| 2013/0256301 | A1* | 10/2013 | Laurent | C03C 3/085 |
| | | | | 219/649 |
| 2013/0265376 | A1* | 10/2013 | Gil-Torrente | C09D 11/30 |
| | | | | 347/102 |

OTHER PUBLICATIONS

English Abstract of CN101462895, Publication Date: Jun. 24, 2009.
English Abstract of EP0419843, Publication Date: Apr. 3, 1991.

* cited by examiner

PIGMENT/FRIT MIXTURES

An aspect of the invention is frits or frit mixtures with pearlescent pigments for ceramic glazes which are stable above 1000° C.

In general, decorative applications in ceramic glazes use mixtures of pigments, for example effect pigments, and ceramic frits/frit mixtures. In particular, these are used for ceramic glazes in the high-temperature range above 1000° C., for example for
single-fired wall tiles at 1100-1200° C.,
single-fired floor tiles at 1100-1250° C.,
porcelain at 1100-1300° C., and double-fired at 1050-1080° C.

They are also employed, in particular, in the case of decorative tiles or porcelain. A problem occurs that the pigments, in particular the representatives from the class of the pearlescent pigments, generally do not survive the aggressive conditions consisting of oxidic melt (frit components) and high temperatures during the firing process without damage.

Efforts have therefore been made in the past to stabilise the effect pigments, in particular pearlescent pigments, by sheathing with insulating protective layers for thermally and chemically extremely highly demanding applications of this type.

It is known from the prior art that a significant loss in tinting strength and pearlescent effect must be expected on use of pearlescent pigments in ceramic glazes used in the region >1000° C. In order to prevent this, these pigments must either be encapsulated in additional protective layers, or alternatively the use of pearlescent pigments in this high-temperature area of application is limited to iron oxide-coated pearlescent pigments in especially modified engobes or fluxes.

EP 220 509 A1 describes, for example, the stabilisation of pearlescent pigments by means of $SnO_2$ and/or $CeO_2$ layers.

EP 307 771 A1 discloses the encapsulation of pearlescent pigments with an Au-doped $SnO_2$ layer for a combination of stabilisation and novel decorative effects. In order to achieve the desired stabilisation, substantial amounts of the oxide/oxide combinations mentioned have to be applied in both cases. It has thus proved advantageous to apply the protective coating in amounts of about 5-30% by weight, based on the entire pigment.

DE 39 32 424 C1 discloses pearlescent pigment/frit combinations with and without additional absorptive pigments. However, the use range of the pigmented glass frit is only a maximum of 700-900° C.

GB 2 096 592 A describes the use of pearlescent pigments in ceramic fluxes comprising frits. Neither the target firing temperature nor the particular problems on use of pearlescent pigments at temperatures of >1000° C. are discussed here.

U.S. Pat. No. 5,783,506 describes the use of $TiO_2$- or $Fe_2O_3$-coated mica pigments in ceramic fluxes which are capable of "leafing", i.e. formulations consisting of frit, dispersant, binder, mica and pearlescent pigment based on mica, of a defined viscosity. The invention in this US patent consists in that the pearlescent pigments migrate to the surface of the glaze (leafing) due to the addition of mica.

U.S. Pat. No. 4,353,991 discloses the use of pearlescent pigments having a particle size of 1-200 µm in "fritted glass enamel" in a concentration range from 0.5 to 25.0% by weight, based on the weight of the frit/pigment mixture. However, these mixtures can only be used at temperatures up to a maximum of 538-760° C.

EP 0 419 843 A1 describes the use of pearlescent pigments in a use concentration of 5-20% by weight in a glass frit. The use temperature is given as 800-900° C. for rapid firing or 700-800° C. for standard firing.

CN 101462895A discloses the use of 10-60% by weight of golden pearlescent pigments in glazes at 1000-1200° C. The frit employed here is composed of
$SiO_2$: 55~80%
$Al_2O_3$: 5~20%
CaO: 0.5-3%
MgO: 0-2%
$Na_2O$: 1~5%
$K_2O$: <5%
$B_2O_3$: 3~15%.

It is disadvantageous here that the use is restricted exclusively to specific gold-coloured pearlescent pigments based on mica, with the layer structure of the gold-coloured pearlescent pigments not being disclosed. The number and choice of colour of the pigments which can be employed is thus very greatly restricted in CN 101462895A.

DE 198 59 420 A1 discloses modified engobes having a pearlescent effect. The coating of earthenware and ceramicware in order to improve (prime) the surface through fineness or colour is usually carried out using engobes. The modified engobes achieve better adhesion of the engobe to the fired or unfired tiles, earthenware and ceramicware. The engobe comprises a frit for the firing range 600-1200° C. and one or more pearlescent pigments.

The solutions known from the prior art, such as, for example, the encapsulation of the pigments, are complex in production, since a further process step for application of the protective layer must be carried out in production. In addition, disadvantageous effects, such as, for example, clouding of the glaze and colour changes in the pigment or poorer control of the colour effect in the application medium, may occur, depending on the composition of the protective layer. The second solution—the use of pearlescent pigments with an iron oxide layer—is in colour terms very limited to the colour effects that can be achieved by iron oxide-coated pearlescent pigments.

An object of the invention was therefore to find a readily controllable combination of frit and pearlescent pigment which is, in particular, reliable from an applicational point of view and is stable at temperatures above 1000° C. and at the same time results in optimal plane-parallel alignment of the pearlescent pigments in the glaze and thus significantly improves the colour effect of pearlescent pigments when used for ceramic glazes in the high-temperature range, i.e. at temperatures >1000° C. Furthermore, the range of colours which can be employed in accordance with the invention should be significantly expanded to include $TiO_2$ interference silver-white, $TiO_2$ interference colours (gold, copper, red, violet, blue, turquoise and green), and iron oxide interference colours in the gold, bronze, copper and red region.

Surprisingly, it has now been found that pearlescent pigments based on flake-form substrates in frit/pearlescent pigment combinations with $Al_2O_3$-rich frits, so-called "hard" frits, are particularly stable in the use range of temperatures >1000° C., and particularly attractive and easily controllable colour effects are thus achieved.

An aspect of the present invention therefore is a pearlescent pigment/frit mixture in which the proportion of pearlescent pigment in the mixture is 5-95% by weight, based on the mixture, and the frit comprises at least 5% of $Al_2O_3$.

The use of "hard" frits results in a significantly improved plane-parallel alignment of the pearlescent pigments within the glaze and thus in an optimised optical effect of the glaze, in particular with respect to colour and gloss. The optimised plane-parallel alignment of the pearlescent pigments is furthermore supported by the combination according to the invention of pearlescent pigment and hard frit and facilitates a high pigment use concentration of, for example, >30% by weight, preferably >50% by weight and in particular 60-95% by weight. Furthermore, the inventive pigment/frit mixture which is optimised for the target temperature range in the application facilitates for the user reliable usability of the pearlescent pigments in ceramic glazes, which, owing to the colour constancy, is accompanied by easy adjustability of the colour effect.

The pearlescent pigment/frit mixture according to the invention furthermore enables the range of colours to be expanded to include $TiO_2$ interference pigments having attractive silver-white and colour interference shades, and by $Fe_2O_3$ interference pigments having mass tones, gold, bronze, copper and red shades. Finally, this inventive combination, which is optimised for the target temperature range in the application, facilitates for the user reliable usability of these pigments.

If the proportion by weight of pigment in the pearlescent pigment/frit mixture is, for example, 5-95% by weight, preferably 20-85% by weight and in particular 30-80% by weight, based on the pigment/frit mixture, the pearlescent pigments in the so-called "hard" frit having an $Al_2O_3$ content of ≥5% by weight, based on the frit, exhibit a pronounced highly plane-parallel alignment of the individual pearlescent pigment particles.

In the case of a pre-specified layer thickness and comparable particle sizes, high pigmentation of the frit favours an approximately plane-parallel alignment, which results in a significantly greater pearlescent effect. In the case of a lower pigment concentration, a random distribution of the alignment is present, as shown in FIGS. 1 and 2. In these two figures, which show sectional side views through a pigmented frit layer before the firing operation, the particles of the frit are represented as round or oval particles and the pearlescent pigments are represented as rods.

The highly plane-parallel alignment of the pearlescent pigments which is advantageous for optimisation of the colour effect can furthermore additionally be favoured if the ratio of the thickness of the pearlescent pigment to the size of the frit particle is preferably on average in an least an order of 0.01-2, in particular 0.5-1.5 and very particularly 1. The frit particles here are generally in flake form, i.e. as flakes (defined by an aspect ratio=ratio of particle diameter to particle thickness of ≥4:1), spherical, oval or irregularly shaped. A factor for the alignment is the size in at least one dimension.

If, for example, the pearlescent pigment has a thickness of 700 nm, it should preferably be mixed with frit particles which have the following dimensions: flake-form frits having a thickness of 700 nm, spherical frits having a diameter of 700 nm or oval or irregularly shaped frit particles having an average particle size of 700 nm.

Preferred dimensions of frit and pearlescent pigment are shown below with reference to some illustrative examples:
1) Pigment thickness: 800 nm, size of the frit particle in at least one dimension 800 nm, ratio: 1
2) Pigment thickness: 800 nm, size of the frit particle in at least one dimension 1600 nm, ratio: 0.5
3) Pigment thickness: 800 nm, size of the frit particle in at least one dimension 400 nm, ratio: 2
4) Pigment thickness: 1600 nm, size of the frit particle in at least one dimension 1600 nm, ratio: 1
5) Pigment thickness: 1600 nm, size of the frit particle in at least one dimension 3200 nm, ratio: 0.5
6) Pigment thickness: 1600 nm, size of the frit particle in at least one dimension 800 nm, ratio: 2.

At values greater than 2, no significant improvement in the alignment of the pigment particles is generally evident. The plane-parallel alignment of the pearlescent pigments in the glaze, which is favourable for the desired intense pearlescent effect, is less adversely affected, the smaller the frit particles are on average in relation to the pigment particles, as depicted diagrammatically in FIGS. 3-5. In addition, flake-form frit particles generally have a very positive effect on the plane-parallel alignment of the likewise flake-form pearlescent pigments. In the figures, the oval or round particles represent the frit particles, while the rods are the pearlescent pigments based on flake-form substrates.

The use of coarse frits, as depicted in FIG. 3, results in dealignment, while the use of a finer frit, i.e. the frit particles are smaller than or approximately the same size as the pearlescent pigment particles in at least one dimension, which is depicted diagrammatically in FIGS. 4 and 5, generally results in very good alignment of the pearlescent pigments. In the case of finer frits, the frit particles preferably have dimensions in the order of the pigment thicknesses, i.e. 10-2,000 nm and in particular 50-1500 nm.

As already mentioned, the optimum plane-parallel alignment of the pearlescent pigments is supported by the combination according to the invention of pearlescent pigment and hard frit, in that this supports a particularly high pigment use concentration of, for example, >30% by weight. The effect generally increases successively from ≥30% by weight, via ≥50% by weight to ≥90% by weight with increasing pigment concentration and is only limited by the onset of chalking of the pigment from the glaze if the frit proportion is too low.

Besides the optimum alignment of the individual pearlescent pigment particles, the temperature stability and the stability to chemically highly reactive media (the frit melt) furthermore play a crucial role for use of the pigment/frit mixture. The use of $Al_2O_3$-containing frits significantly increases the temperature stability. The $Al_2O_3$ content in the frit is preferably ≥5% by weight, in particular ≥7% by weight and very particularly preferably ≥9% by weight, based on the frit.

The commercially available frits are usually composed of constituents which are usual in frits, such as, for example, $Al_2O_3$, $SiO_2$, $B_2O_3$, $TiO_2$, $ZrO_2$, $Sb_2O_3$, $P_2O_5$, $Fe_2O_3$, alkali metal oxides and alkaline-earth metal oxides.

Preferred frits comprise
($Na_2O+K_2O+Li_2O$)<10% by weight
$Al_2O_3$>5% by weight
$SiO_2$>50% by weight
where the total proportion of all constituents of the frit is 100%.

Suitable frits having a content of $Al_2O_3$ of ≥5% by weight, based on the frit, are commercially available. As an example, without restricting the number of frits/fluxes that can be employed, mention may be made of FLUX 101911, FLUX DSDC101915, frit DA4193 or frit DA4113 from Ferro.

The temperature stability can—purely optionally—furthermore be increased if the pigment/frit mixture according to the invention is employed on an engobe which has previously been applied to the workpiece (body). Engobes are mixtures which may comprise molten ceramic frits, ceramic raw materials or minerals, glass or crockery porcelain powder and/or inorganic opacifiers. These engobes can be applied in ground form as aqueous suspensions (slips) to ceramic substrates in order to mask the hue of the substrate and to improve processing of the subsequent coatings or layers, without at the same time adversely affecting the adhesion or surface quality of the finished product. The use of the engobe increases the use temperature further by 40-80 K, for example from 1120-1160° C. to 1180-1200° C.

The pearlescent pigment/frit mixture according to the invention can, however, preferably also be fired directly onto the workpiece, and then exhibits highly chromatic colour effects in the high target temperature range, i.e. at 1150-1200° C. The additional advantage thus arises that the colour pattern can be applied to the workpiece using only a single printing step, whereas a second printing step would be necessary for the engobe.

Finally, particularly high temperature stability is generally achieved if use is made of pearlescent pigments based on flake-form substrates which are stable at high temperatures. Examples which may be mentioned here are: corundum—$Al_2O_3$, carborundum—SiC, boron nitride—BN, graphite and haematite—$Fe_2O_3$.

It is also possible to employ mixtures of different substrates or mixtures of the same substrates having different particle sizes. The substrates can be mixed with one another in any weight ratio. 10:1 to 1:10 mixtures are preferably employed, in particular 1:1 mixtures. Particular preference is given to substrate mixtures consisting of substrate flakes having different particle sizes, in particular mixtures of S fraction (10-200 μm), N fraction (10-60 μm) and F fraction (5-25 μm), but also of F fraction (5-25 μm) and M fraction (1-15 μm).

The size of the base substrates is not crucial per se and can be matched to the particular application and desired target effect/target texture: for example, satin or highly glittering.

In general, the flake-form substrates, also referred to as flake substrates, preferably have a thickness of 0.05-5 μm, more preferably 0.1-2 μm, in particular 0.1-1 μm. The size in the two other dimensions is preferably 1-500 μm, more preferably 1-250 μm and in particular 1-60 μm.

The thickness of at least one individual layer on the base substrate of the pearlescent pigment is essential for the optical properties of the pigment, as already described in numerous patents and patent applications, for example in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

The pigment must have at least one optically active layer, preferably a high-refractive-index layer (for example $TiO_2$, $Fe_2O_3$, $SnO_2$, etc.). High-refractive-index layers here are taken to mean all layers which have a refractive index of n ≥1.8, preferably of n ≥2.0.

Use is very particularly preferably made in the pearlescent pigment/frit mixtures according to the invention of pearlescent pigments based on synthetic mica flakes, natural mica flakes and very particularly preferably based on high-temperature-resistant flakes, such as, for example, $Al_2O_3$, SiC, $B_4C$, BN, graphite, $TiO_2$ and $Fe_2O_3$ flakes.

Suitable substrate flakes for the pearlescent pigments may be doped or undoped. If they are doped, the doping is preferably Al, N, B, Ti, Zr, Si, In, Sn or Zn or mixtures thereof. Furthermore, further ions from the group of the transition metals (V, Cr, Mn, Fe, Co, Ni, Cu, Y, Nb, Mo, Hf, Ta, W) and ions from the group of the lanthanides may serve as dopants.

In the case of $Al_2O_3$, the substrate is preferably undoped or doped with $TiO_2$, $ZrO_2$ or ZnO. The $Al_2O_3$ flakes are preferably corundum. Suitable $Al_2O_3$ flakes are preferably doped or undoped α-$Al_2O_3$ flakes, in particular $TiO_2$-doped α-$Al_2O_3$ flakes. If the substrate is doped, the proportion of the doping is preferably 0.01-5.00% by weight, in particular 0.10-3.00% by weight, based on the substrate.

Suitable $Al_2O_3$ flakes preferably have an equivalence diameter distribution according to which 90% of the particles are in the range 5-45 μm, preferably 5-40 μm.

The $D_{50}$ values of the $Al_2O_3$ flakes are preferably in the range 15-30 μm, very particularly preferably in the range from 15-25 μm.

The $D_{10}$ values are preferably in the range 5-15 μm, very particularly preferably in the range 6-10 μm.

Throughout the application, the $D_{10}$, $D_{50}$ and $D_{90}$ values are determined using a Malvern MS 2000.

The thickness of the $Al_2O_3$ flakes is preferably 50-1200 nm, more preferably 150-800 nm and in particular 200-450 nm.

In a very particularly preferred embodiment, the thickness of the $Al_2O_3$ flakes is <500 nm, preferably 150-450 nm and in particular 150-400 nm.

The aspect ratio (diameter/thickness ratio) of the $Al_2O_3$ flakes is preferably 10-1000, in particular 50-500.

In a further preferred embodiment, the aspect ratio of the $Al_2O_3$ flakes is 30-200, in particular 50-150.

In a preferred embodiment, the flake-form substrate is coated with one or more transparent, semi-transparent and/or opaque layers comprising metal oxides, metal oxide hydrates, metal silicates, metal suboxides, metals, metal fluorides, metal nitrides, metal oxynitrides or mixtures of these materials. The metal oxide, metal oxide hydrate, metal silicate, metal suboxide, metal, metal fluoride, metal nitride or metal oxynitride layers or the mixtures thereof can have a low refractive index (refractive index <1.8) or a high refractive index (refractive index ≥1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, zirconium silicate $ZrSiO_4$, mullite, titanium oxide, in particular titanium dioxide, titanium oxide hydrate and mixtures thereof, such as, for example, illmenite or pseudobrookite. Metal suboxides which can be employed are, for example, the titanium suboxides (for example $Ti_2O_3$ or γ-$Ti_3O_5$). Suitable metal silicates are aluminium silicate, Mg silicate, Ca silicate or Ba silicate; mixed alkaline-earth metal silicates, such as, for example, Ca/Mg silicate, Zr silicate or mixtures of the said silicates. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly preferably metal oxide and/or metal oxide hydrate layers are preferably applied to the support. Furthermore, multilayered structures comprising high- and low-refractive-index metal oxide, metal oxide hydrate, metal or metal fluoride layers may also be present, with high- and low-refractive-index layers preferably alternating. Particular preference is given to layer packages comprising a high-refractive-index layer and a low-refractive-index layer, where one or more of these layer packages may be applied to the support. The sequence of the high- and low-refractive-index layers here can be matched to the support in order to incorporate the support into the multilayered structure. In a further embodiment, the metal oxide, metal silicate, metal oxide hydrate, metal suboxide, metal, metal fluoride, metal nitride or metal oxynitride layers may be mixed or doped with colorants or other elements. Suitable colorants or other elements are, for example, inorganic coloured pigments, such as coloured metal oxides, for example magnetite, chromium(III) oxide or coloured pigments, such as, for example, Thenard's Blue (a Co/Al spinel) or elements, such as, for example, yttrium or antimony, and generally pigments from the structural class of the perovskites, pyrochlores, rutiles and spinels. Pearlescent pigments comprising these layers exhibit great colour variety with respect to their mass tone and may in many cases exhibit an angle-dependent change in colour (colour flop) due to interference.

In a preferred embodiment, the outer layer on the support is a high-refractive-index metal oxide. This outer layer may additionally be on the above-mentioned layer packages or, in the case of high-refractive-index supports, may be part of a layer package and consist, for example, of $TiO_2$, titanium suboxides, $Fe_2O_3$, $SnO_2$, ZnO, $ZrO_2$, $Ce_2O_3$, CoO, $Co_3O_4$, $V_2O_5$, $Cr_2O_3$ and/or mixtures thereof, such as, for example, ilmenite or pseudobrookite.

The thickness of the metal oxide, metal oxide hydrate, metal silicate, metal suboxide, metal, metal fluoride, metal nitride or metal oxynitride layers or a mixture thereof is preferably 3 to 300 nm and, in the case of the metal oxide, metal oxide hydrate, metal suboxide, metal fluoride, metal nitride or metal oxynitride layers or a mixture thereof, more preferably 20 to 200 nm. The thickness of the metal layers is preferably 4 to 50 nm.

The optical layer preferably consists of $TiO_2$, $ZrO_2$, $Fe_2O_3$, $Fe_3O_4$, $SnO_2$, ZnO, or mixtures or combinations thereof. The layer may be undoped or doped. Suitable dopants are, for example, alkaline-earth metals or compounds thereof, in particular calcium and magnesium. The doping proportion is generally a maximum of 5% by weight, based on the respective layer.

The optical layer is particularly preferably a $TiO_2$ layer, an $Fe_2O_3$ layer, a $TiO_2/Fe_2O_3$ mixed layer, a pseudobrookite layer ($Fe_2TiO_5$) or a combination of these layers in a multilayered system, such as, for example, $TiO_2$—$SiO_2$—$TiO_2$ or $Fe_2O_3$—$SiO_2$—$Fe_2O_3$.

The titanium dioxide may be present in the high-refractive-index coating in the rutile or anatase modification, preferably in the form of rutile. The processes for the preparation of rutile are described, for example, in the prior art in U.S. Pat. Nos. 5,433,779, 4,038,099, 6,626,989, DE 25 22 572 C2 and EP 0 271 767 B1. A thin tin oxide layer (<10 nm), which serves as additive in order to convert the $TiO_2$ into rutile, is preferably applied to the substrate flakes before the $TiO_2$ precipitation.

The thickness of the optically active layer is preferably in each case 30 to 350 nm, in particular 50 to 250 nm.

Pearlescent pigments based on flake-form substrates which are particularly preferred for the pigment/frit mixture according to the invention are indicated below:
substrate flake+$TiO_2$
substrate flake+$Fe_2O_3$
substrate flake+$Fe_3O_4$
substrate flake+$TiO_2/Fe_2O_3$
substrate flake+$FeTiO_3$
substrate flake+$Fe_2TiO_5$
substrate flake+$ZrO_2$
substrate flake+ZnO
substrate flake+$SnO_2$
substrate flake+$Cr_2O_3$
substrate flake+$Ce_2O_3$
substrate flake+$TiO_x$ (reduced), where x=1.50-1.95
substrate flake+$TiO_2$+$Fe_2O_3$
substrate flake+$TiO_2$+$Fe_3O_4$
substrate flake+$Fe_2O_3$+$TiO_2$
substrate flake+$TiO_2$+$SiO_2$+$TiO_2$
substrate flake+$TiO_2$+$SnO_2$+$TiO_2$
substrate flake+$TiO_2$+$Al_2O_3$+$TiO_2$
substrate flake+$Fe_2O_3$+$SiO_2$+$TiO_2$
substrate flake+$TiO_2/Fe_2O_3$+$SiO_2$+$TiO_2$
substrate flake+$TiO_2/Fe_2O_3$+$SiO_2$+$TiO_2/Fe_2O_3$
substrate flake+$TiO_2/Fe_2O_3$+$SiO_2$+$TiO_2$+$TiO_2/Fe_2O_3$
substrate flake+$TiO_2$+$SiO_2$+$TiO_2/Fe_2O_3$
substrate flake+$TiO_2$+$SiO_2$
substrate flake+$TiO_2$+$Al_2O_3$
substrate flake+$TiO_2$+MgO×$SiO_2$+$TiO_2$
substrate flake+$Fe_2O_3$+MgO×$SiO_2$+$TiO_2$
substrate flake+$TiO_2/Fe_2O_3$+MgO×$SiO_2$+$TiO_2$
substrate flake+$TiO_2/Fe_2O_3$+MgO×$SiO_2$+$TiO_2/Fe_2O_3$
substrate flake+$TiO_2/Fe_2O_3$+MgO×$SiO_2$+$TiO_2$+$TiO_2/Fe_2O_3$
substrate flake+$TiO_2$+MgO×$SiO_2$+$TiO_2/Fe_2O_3$
substrate flake+$SnO_2$+$TiO_2$+$SiO_2$+$SnO_2$+$TiO_2$
substrate flake+$SnO_2$+$TiO_2$+$SnO_2$+$TiO_2$
substrate flake+$SnO_2$+$TiO_2$+$Fe_2O_3$+$SiO_2$+$SnO_2$+$TiO_2$+$Fe_2O_3$
substrate flake+$Fe_2O_3$+$SnO_2$+$TiO_2$
substrate flake+$Fe_2O_3$+$SnO_2$+$Fe_2O_3$
substrate flake+$TiO_2$+$SnO_2$+$TiO_2$
substrate flake+$TiO_2/Fe_2O_3$+$SnO_2$+$TiO_2$
substrate flake+$TiO_2/Fe_2O_3$+$SnO_2$+$TiO_2/Fe_2O_3$
substrate flake+$SnO_2$+$TiO_2$+$Fe_2O_3$+$SnO_2$+$TiO_2$+$Fe_2O_3$.
substrate flake+$Fe_2TiO_5$+$SnO_2$+$Fe_2TiO_5$
substrate flake+$Fe_2TiO_5$+$SiO_2$+$Fe_2TiO_5$ In a further preferred embodiment, a first low-refractive-index layer is firstly applied to the substrate flake. Low-refractive-index layer in this application is taken to mean a layer which has a refractive index of <1.8.

The low-refractive-index layer on the substrate is preferably selected from the group $Al_2O_3$, $SiO_2$, zirconium silicate $ZrSiO_4$, mullite $3Al_2O_3×2SiO_2$ or $2Al_2O_3×SiO_2$ (sintered or fused mullite) or alkaline-earth metal silicate ($MSiO_3$, where $M=Mg^{2+}$, $Ca^{2+}$, $Sr^{2+}$ or $Ba^{2+}$, or $M_2Si_3O_8$, where $M=Mg^{2+}$, $Ca^{2+}$, $Sr^{2+}$ or $Ba^{2+}$).

Preferred pigments having a low-refractive-index layer (LRL) on the substrate surface are distinguished by the following structures:
substrate flake+LRL+$TiO_2$
substrate flake+LRL+$Fe_2O_3$
substrate flake+LRL+$Fe_3O_4$
substrate flake+LRL+$TiO_2/Fe_2O_3$
substrate flake+LRL+$FeTiO_3$
substrate flake+LRL+$Fe_2TiO_5$
substrate flake+LRL+$ZrO_2$
substrate flake+LRL+ZnO
substrate flake+LRL+$SnO_2$
substrate flake+LRL+$Cr_2O_3$
substrate flake+LRL+$Ce_2O_3$
substrate flake+LRL+$TiO_x$ (reduced), where x=1.50-1.95
substrate flake+LRL+$TiO_2$+$Fe_2O_3$
substrate flake+LRL+$TiO_2$+$Fe_3O_4$
substrate flake+LRL+$Fe_2O_3$+$TiO_2$
substrate flake+LRL+$TiO_2$+$SiO_2$+$TiO_2$
substrate flake+LRL+$TiO_2$+$SnO_2$+$TiO_2$
substrate flake+LRL+$TiO_2$+$Al_2O_3$+$TiO_2$
substrate flake+LRL+$Fe_2O_3$+$SiO_2$+$TiO_2$ substrate flake+LRL+TiO$_2$/Fe$_2$O$_3$+SiO$_2$+TiO$_2$
substrate flake+LRL+TiO$_2$/Fe$_2$O$_3$+SiO$_2$+TiO$_2$/Fe$_2$O$_3$
substrate flake+LRL+TiO$_2$/Fe$_2$O$_3$+SiO$_2$+TiO$_2$+TiO$_2$/Fe$_2$O$_3$
substrate flake+LRL+TiO$_2$+SiO$_2$+TiO$_2$/Fe$_2$O$_3$
substrate flake+LRL+TiO$_2$+SiO$_2$
substrate flake+LRL+TiO$_2$+Al$_2$O$_3$
substrate flake+LRL+TiO$_2$+MgO×SiO$_2$+TiO$_2$
substrate flake+LRL+Fe$_2$O$_3$+MgO×SiO$_2$+TiO$_2$
substrate flake+LRL+TiO$_2$/Fe$_2$O$_3$+MgO×SiO$_2$+TiO$_2$
substrate flake+LRL+TiO$_2$/Fe$_2$O$_3$+MgO×SiO$_2$+TiO$_2$/Fe$_2$O$_3$
substrate flake+LRL+TiO$_2$/Fe$_2$O$_3$+MgO×SiO$_2$+TiO$_2$+TiO$_2$/Fe$_2$O$_3$
substrate flake+LRL+TiO$_2$+MgO×SiO$_2$+TiO$_2$/Fe$_2$O$_3$
substrate flake+LRL+SnO$_2$+TiO$_2$+SiO$_2$+SnO$_2$+TiO$_2$
substrate flake+LRL+SnO$_2$+TiO$_2$+SnO$_2$+TiO$_2$
substrate flake+LRL+SnO$_2$+TiO$_2$+Fe$_2$O$_3$+SiO$_2$+SnO$_2$+TiO$_2$+Fe$_2$O$_3$
substrate flake+LRL+Fe$_2$O$_3$+SnO$_2$+TiO$_2$
substrate flake+LRL+Fe$_2$O$_3$+SnO$_2$+Fe$_2$O$_3$
substrate flake+LRL+TiO$_2$+SnO$_2$+TiO$_2$
substrate flake+LRL+TiO$_2$/Fe$_2$O$_3$+SnO$_2$+TiO$_2$
substrate flake+LRL+TiO$_2$/Fe$_2$O$_3$+SnO$_2$+TiO$_2$/Fe$_2$O$_3$
substrate flake+LRL+SnO$_2$+TiO$_2$+Fe$_2$O$_3$+SnO$_2$+TiO$_2$+Fe$_2$O$_3$
substrate flake+LRL+Fe$_2$TiO$_5$+SnO$_2$+Fe$_2$TiO$_5$
substrate flake+LRL+Fe$_2$TiO$_5$+SiO$_2$+Fe$_2$TiO$_5$ It is also possible to use different pearlescent pigments as a mixture in the pearlescent pigment/frit mixture according to the invention. Preferably, only one type of pearlescent pigment is employed.

Layer or coating in this application is taken to mean the complete covering of the flake-form substrate.

The pearlescent pigments can be prepared relatively easily. The covering of substrate flakes is preferably carried out by wet-chemical methods, where the wet-chemical coating methods developed for the preparation of pearlescent pigments can be used. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

Furthermore, the coating of the substrates can also be carried out by gas-phase coating in a fluidised-bed reactor, where, for example, the processes proposed for the preparation of pearlescent pigments in EP 0 045 851 A1 and EP 0 106 235 A1 can be used correspondingly.

In the case of wet coating, the substrate particles are suspended in water, and one or more soluble metal salts are added at a pH which is suitable for hydrolysis, which is selected so that the metal oxides or metal oxide hydrates are precipitated directly onto the flakes without secondary precipitations occurring. The pH is usually kept constant by simultaneous metered addition of a base or acid. The pigments are subsequently separated off, washed and dried and optionally calcined, where the calcination temperature can be optimised with respect to the coating present in each case. In general, the calcination temperatures are between 250 and 1000° C., preferably between 350 and 900° C. If desired, the pigments can be separated off after application of individual coatings, dried and optionally calcined and then resuspended for precipitation of the further layers.

If, for example, a TiO$_2$ or TiO$_2$/Fe$_2$O$_3$ layer is to be reduced, the reduction of the finished pearlescent pigment is preferably carried out after drying by subsequently calcining the pigment at 500 to 1200° C., preferably at 500-1000° C., in particular at 500-800° C., for 0.5-5 h, preferably for 0.5-2 h, under reducing conditions, preferably under forming gas (N$_2$/H$_2$). On use of pigments which have been calcined under reducing conditions in the glaze, however, it has proven helpful likewise to select reducing conditions under the firing conditions for the workpiece to be glazed.

In order to improve the wettability and/or compatibility with the printing medium, it is frequently preferred, depending on the area of application, to subject the finished pearlescent pigment to inorganic or organic post-coating or post-treatment. Suitable post-coatings or post-treatments are, for example, the processes described in DE patent 22 15 191, DE-A 31 51 354, DE-A 32 35 017 or DE-A 33 34 598. This post-coating simplifies handling of the pigment, in particular incorporation into various media. In order to improve the wettability, dispersibility and/or compatibility with the application media, functional coatings comprising organic or combined organic/inorganic post-coatings may be possible, for example with silanes, as described, for example, in DE 10348174, EP 0090259, EP 0 342 533, EP 0 632 109, EP 0 888 410, EP 0 634 459, EP 1 203795, WO 94/01498, WO 96/32446, WO 99/57204, WO 2004/092284, U.S. Pat. Nos. 5,759,255, 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, pp. 471-493. The post-coating merely comprises a proportion by weight of preferably 0.1 to 5% by weight, more preferably 0.5 to 3% by weight, based on the pearlescent pigment.

In a particular embodiment of the invention, the pearlescent pigments are hydrophobically or amphiphilically post-coated, which, on application via printing pastes, results in the advantage of more homogeneous distribution in the print medium and thus more homogeneous colour distribution on the workpiece.

The pearlescent pigment/frit mixture according to the invention expands the range of colours of pigmented ceramic glazes on fired or unfired bricks, floor and wall tiles for indoor or outdoor use, sanitary ceramics, such as bathtubs, washbasins and toilet pans, porcelain crockery, earthenware and ceramicware by attractive interference colours (silver, gold, bronze, copper, red, violet, blue, turquoise, green), and with so-called mass tone pearlescent pigments, which are distinguished by a combination of interference and absorption colour, in particular in the region of gold, brass, bronze, copper, red and green shades. It furthermore also facilitates entirely novel colour effects, such as viewing angle-dependent so-called colour flop effects. The choice of the pearlescent pigment furthermore facilitates novel optical effects, such as sparkle/glitter effects and coarse or fine structures.

The invention also relates to the use of the pearlescent pigment/frit mixture according to the invention for ceramic glazes on fired or unfired bricks, floor and wall tiles for indoor or outdoor use, sanitary ceramics, porcelain, earthenware and ceramicware.

The invention thus also relates to formulations comprising the pearlescent pigment/frit mixture according to the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102015013400, filed Oct. 19, 2015, are incorporated by reference herein.

The following examples are intended to explain the invention, but without limiting it.

EXAMPLES

The preparation and characterisation of a pigment/frit mixture according to the invention is divided into four steps:
1) Preparation of the Printing Paste:

For the preparation of fine colour grids and relief-like prints on ceramic substrates by means of ceramic colours, use is made of screen printing oils, which prevent running of the colour pastes after printing and give rise to prints with sharp contours. To this end, use is made of additives for the known binders, which consist of finely divided natural and synthetic waxes and/or of finely divided inorganic silicate or oxidic substances which are capable of incorporation into the silicate structure of the flux during firing. The pearlescent pigment with the corresponding amount of frit and the print medium (screen printing oil 221-ME and Screenprint Bulk 803035 MR—both commercially available products from Ferro—were employed in the examples) are weighed out and homogenised for a series of experiments (see Table 1).

The effect pigment according to Examples 1 to 275 is weighed out and homogenised with the corresponding amount of frit of the following composition:

| Frit | CaO | $Na_2O$ | $K_2O$ | BaO | $Al_2O_3$ | $SiO_2$ | $B_2O_3$ |
|---|---|---|---|---|---|---|---|
| % by wt. | 9.7 | 5.2 | 1.1 | 1.3 | 10.1 | 69.6 | 3.0 |

The weight of the corresponding raw materials, i.e. pearlescent pigment, frit and printing oil, for paste preparation is shown in the following table:

TABLE 1

| Example No. | Pearlescent pigment | Frit | Printing oil | Pasting ratio | $W_{pig}$ in the solid | $W_{pig}$ in the paste |
|---|---|---|---|---|---|---|
| 1 | 1.5 g Xirallic © Crystal Silver (Merck KGaA) | 3.5 g | 7.0 g | 10:14 | 30.00 | 12.50 |
| 2 | 1.0 g Xirallic © Crystal Silver (Merck KGaA) | 3.5 g | 7.0 g | 10:15.6 | 22.22 | 8.70 |
| 3 | 0.8 g Xirallic © Crystal Silver (Merck KGaA) | 3.5 g | 7.0 g | 10:16.3 | 18.60 | 7.08 |
| 4 | 0.6 g Xirallic © Crystal Silver (Merck KGaA) | 3.5 g | 7.0 g | 10:17.1 | 14.63 | 5.41 |
| 5 | 1.5 g Xirallic © Crystal Silver (Merck KGaA) | 3.5 g | 9.0 g | 10:18 | 30.00 | 10.71 |
| 6 | 1.0 g Xirallic © Crystal Silver (Merck KGaA) | 3.5 g | 9.0 g | 10:20 | 22.22 | 7.41 |
| 7 | 0.8 g Xirallic © Crystal Silver (Merck KGaA) | 3.5 g | 9.0 g | 10:20.9 | 18.60 | 6.02 |
| 8 | 0.6 g Xirallic © Crystal Silver (Merck KGaA) | 3.5 g | 9.0 g | 10:22 | 14.63 | 4.58 |
| 9 | 1.5 g Xirallic © Crystal Silver (Merck KGaA) | 2.0 g | 7.0 g | 10:20 | 42.86 | 14.29 |
| 10 | 1.5 g Xirallic © Crystal Silver (Merck KGaA) | 1.5 g | 7.0 g | 10:23.3 | 50.00 | 15.00 |
| 11 | 1.5 g Xirallic © Crystal Silver (Merck KGaA) | 1.0 g | 7.0 g | 10:28 | 60.00 | 15.79 |
| 12 | 1.5 g Xirallic © Crystal Silver (Merck KGaA) | 0.5 g | 7.0 g | 10:35 | 75.00 | 16.67 |
| 13 | 5.0 g Xirallic © Crystal Silver (Merck KGaA) | 0.0 g | 7.0 g | 10:14 | 100.00 | 41.67 |
| 14 | 2.0 g Xirallic © Crystal Silver (Merck KGaA) | 3.0 g | 7.0 g | 10:14 | 40.00 | 16.67 |
| 15 | 3.8 g Xirallic © Crystal Silver (Merck KGaA) | 1.2 g | 7.0 g | 10:14 | 76.00 | 31.67 |
| 16 | 4.3 g Xirallic © Crystal Silver (Merck KGaA) | 0.7 g | 7.0 g | 10:14 | 86.00 | 35.83 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 17 | 4.5 g Xirallic © Crystal Silver (Merck KGaA) | 0.5 g | 7.0 g | 10:14 | 90.00 | 37.50 |
| 18 | 4.8 g Xirallic © Crystal Silver (Merck KGaA) | 0.2 g | 7.0 g | 10:14 | 96.00 | 40.00 |
| 19 | 4.9 g Xirallic © Crystal Silver (Merck KGaA) | 0.1 g | 7.0 g | 10:14 | 98.00 | 40.83 |
| 20 | 1.5 g Iriodin © 103 (Merck KGaA) | 3.5 g | 7.0 g | 10:14 | 30.00 | 12.50 |
| 21 | 1.0 g Iriodin © 103 (Merck KGaA) | 3.5 g | 7.0 g | 10:15.6 | 22.22 | 8.70 |
| 22 | 0.8 g Iriodin © 103 (Merck KGaA) | 3.5 g | 7.0 g | 10:16.3 | 18.60 | 7.08 |
| 23 | 0.6 g Iriodin © 103 (Merck KGaA) | 3.5 g | 7.0 g | 10:17.1 | 14.63 | 5.41 |
| 24 | 1.5 g Iriodin © 103 (Merck KGaA) | 3.5 g | 9.0 g | 10:18 | 30.00 | 10.71 |
| 25 | 1.0 g Iriodin © 103 (Merck KGaA) | 3.5 g | 9.0 g | 10:20 | 22.22 | 7.41 |
| 26 | 0.8 g Iriodin © 103 (Merck KGaA) | 3.5 g | 9.0 g | 10:20.9 | 18.60 | 6.02 |
| 27 | 0.6 g Iriodin © 103 (Merck KGaA) | 3.5 g | 9.0 g | 10:22 | 14.63 | 4.58 |
| 28 | 1.5 g Iriodin © 103 (Merck KGaA) | 2.0 g | 7.0 g | 10:20 | 42.86 | 14.29 |
| 29 | 1.5 g Iriodin © 103 (Merck KGaA) | 1.5 g | 7.0 g | 10:23.3 | 50.00 | 15.00 |
| 30 | 1.5 g Iriodin © 103 (Merck KGaA) | 1.0 g | 7.0 g | 10:28 | 60.00 | 15.79 |
| 31 | 1.5 g Iriodin © 103 (Merck KGaA) | 0.5 g | 7.0 g | 10:35 | 75.00 | 16.67 |
| 32 | 5.0 g Iriodin © 103 (Merck KGaA) | 0.0 g | 7.0 g | 10:14 | 100.0 | 41.67 |
| 33 | 2.0 g Iriodin © 103 (Merck KGaA) | 3.0 g | 7.0 g | 10:14 | 40.00 | 16.67 |
| 34 | 3.8 g Iriodin © 103 (Merck KGaA) | 1.2 g | 7.0 g | 10:14 | 76.00 | 31.67 |
| 35 | 4.3 g Iriodin © 103 (Merck KGaA) | 0.7 g | 7.0 g | 10:14 | 86.00 | 35.83 |
| 36 | 4.5 g Iriodin © 103 (Merck KGaA) | 0.5 g | 7.0 g | 10:14 | 90.00 | 37.50 |
| 37 | 4.8 g Iriodin © 103 (Merck KGaA) | 0.2 g | 7.0 g | 10:14 | 96.00 | 40.00 |
| 38 | 4.9 g Iriodin © 103 (Merck KGaA) | 0.1 g | 7.0 g | 10:14 | 98.00 | 40.83 |
| 39 | 1.5 g Iriodin © 305 (Merck KGaA) | 3.5 g | 7.0 g | 10:14 | 30.00 | 12.50 |
| 40 | 1.0 g Iriodin © 305 (Merck KGaA) | 3.5 g | 7.0 g | 10:15.6 | 22.22 | 8.70 |
| 41 | 0.8 g Iriodin © 305 (Merck KGaA) | 3.5 g | 7.0 g | 10:16.3 | 18.60 | 7.08 |
| 42 | 0.6 g Iriodin © 305 (Merck KGaA) | 3.5 g | 7.0 g | 10:17.1 | 14.63 | 5.41 |
| 43 | 1.5 g Iriodin © 305 (Merck KGaA) | 3.5 g | 9.0 g | 10:18 | 30.00 | 10.71 |
| 44 | 1.0 g Iriodin © 305 (Merck KGaA) | 3.5 g | 9.0 g | 10:20 | 22.22 | 7.41 |
| 45 | 0.8 g Iriodin © 305 (Merck KGaA) | 3.5 g | 9.0 g | 10:20.9 | 18.60 | 6.02 |
| 46 | 0.6 g Iriodin © 305 (Merck KGaA) | 3.5 g | 9.0 g | 10:22 | 14.63 | 4.58 |
| 47 | 1.5 g Iriodin © 305 (Merck KGaA) | 2.0 g | 7.0 g | 10:20 | 42.86 | 14.29 |
| 48 | 1.5 g Iriodin © 305 (Merck KGaA) | 1.5 g | 7.0 g | 10:23.3 | 50.00 | 15.00 |
| 49 | 1.5 g Iriodin © 305 (Merck KGaA) | 1.0 g | 7.0 g | 10:28 | 60.00 | 15.79 |
| 50 | 1.5 g Iriodin © 305 (Merck KGaA) | 0.5 g | 7.0 g | 10:35 | 75.00 | 16.67 |
| 51 | 5.0 g Iriodin © 305 (Merck KGaA) | 0.0 g | 7.0 g | 10:14 | 100.0 | 41.67 |
| 52 | 2.0 g Iriodin © 305 (Merck KGaA) | 3.0 g | 7.0 g | 10:14 | 40.00 | 16.67 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 53 | 3.8 g Iriodin © 305 (Merck KGaA) | 1.2 g | 7.0 g | 10:14 | 76.00 | 31.67 |
| 54 | 4.3 g Iriodin © 305 (Merck KGaA) | 0.7 g | 7.0 g | 10:14 | 86.00 | 35.83 |
| 55 | 4.5 g Iriodin © 305 (Merck KGaA) | 0.5 g | 7.0 g | 10:14 | 90.00 | 37.50 |
| 56 | 4.8 g Iriodin © 305 (Merck KGaA) | 0.2 g | 7.0 g | 10:14 | 96.00 | 40.00 |
| 57 | 4.9 g Iriodin © 305 (Merck KGaA) | 0.1 g | 7.0 g | 10:14 | 98.00 | 40.83 |
| 58 | 1.5 g Iriodin © 4504 Lava Red (Merck KGaA) | 3.5 g | 7.0 g | 10:14 | 30.00 | 12.50 |
| 59 | 1.0 g Iriodin © 4504 Lava Red (Merck KGaA) | 3.5 g | 7.0 g | 10:15.6 | 22.22 | 8.70 |
| 60 | 0.8 g Iriodin © 4504 Lava Red (Merck KGaA) | 3.5 g | 7.0 g | 10:16.3 | 18.60 | 7.08 |
| 61 | 0.6 g Iriodin © 4504 Lava Red (Merck KGaA) | 3.5 g | 7.0 g | 10:17.1 | 14.63 | 5.41 |
| 62 | 1.5 g Iriodin © 4504 Lava Red (Merck KGaA) | 3.5 g | 9.0 g | 10:18 | 30.00 | 10.71 |
| 63 | 1.0 g Iriodin © 4504 Lava Red (Merck KGaA) | 3.5 g | 9.0 g | 10:20 | 22.22 | 7.41 |
| 64 | 0.8 g Iriodin © 4504 Lava Red (Merck KGaA) | 3.5 g | 9.0 g | 10:20.9 | 18.60 | 6.02 |
| 65 | 0.6 g Iriodin © 4504 Lava Red (Merck KGaA) | 3.5 g | 9.0 g | 10:22 | 14.63 | 4.58 |
| 66 | 1.5 g Iriodin © 4504 Lava Red (Merck KGaA) | 2.0 g | 7.0 g | 10:20 | 42.86 | 14.29 |
| 67 | 1.5 g Iriodin © 4504 Lava Red (Merck KGaA) | 1.5 g | 7.0 g | 10:23.3 | 50.00 | 15.00 |
| 68 | 1.5 g Iriodin © 4504 Lava Red (Merck KGaA) | 1.0 g | 7.0 g | 10:28 | 60.00 | 15.79 |
| 69 | 1.5 g Iriodin © 4504 Lava Red (Merck KGaA) | 0.5 g | 7.0 g | 10:35 | 75.00 | 16.67 |
| 70 | 5.0 g Iriodin © 4504 Lava Red (Merck KGaA) | 0.0 g | 7.0 g | 10:14 | 100.00 | 41.67 |
| 71 | 2.0 g Iriodin © 4504 Lava Red (Merck KGaA) | 3.0 g | 7.0 g | 10:14 | 40.00 | 16.67 |
| 72 | 3.8 g Iriodin © 4504 Lava Red (Merck KGaA) | 1.2 g | 7.0 g | 10:14 | 76.00 | 31.67 |
| 73 | 4.3 g Iriodin © 4504 Lava Red (Merck KGaA) | 0.7 g | 7.0 g | 10:14 | 86.00 | 35.83 |
| 74 | 4.5 g Iriodin © 4504 Lava Red (Merck KGaA) | 0.5 g | 7.0 g | 10:14 | 90.00 | 37.50 |
| 75 | 4.5 g Iriodin © 4504 Lava Red (Merck KGaA) | 0.2 g | 7.0 g | 10:14 | 96.00 | 40.00 |
| 76 | 4.8 g Iriodin © 4504 Lava Red (Merck KGaA) | 0.1 g | 7.0 g | 10:14 | 98.00 | 40.83 |
| 77 | 1.5 g Iriodin © 9219 (Merck KGaA) | 3.5 g | 7.0 g | 10:14 | 30.00 | 12.50 |
| 78 | 1.0 g Iriodin © 9219 (Merck KGaA) | 3.5 g | 7.0 g | 10:15.6 | 22.22 | 8.70 |
| 79 | 0.8 g Iriodin © 9219 (Merck KGaA) | 3.5 g | 7.0 g | 10:16.3 | 18.60 | 7.08 |
| 80 | 0.6 g Iriodin © 9219 (Merck KGaA) | 3.5 g | 7.0 g | 10:17.1 | 14.63 | 5.41 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 81 | 1.5 g Iriodin © 9219 (Merck KGaA) | 3.5 g | 9.0 g | 10:18 | 30.00 | 10.71 |
| 82 | 1.0 g Iriodin © 9219 (Merck KGaA) | 3.5 g | 9.0 g | 10:20 | 22.22 | 7.41 |
| 83 | 0.8 g Iriodin © 9219 (Merck KGaA) | 3.5 g | 9.0 g | 10:20.9 | 18.60 | 6.02 |
| 84 | 0.6 g Iriodin © 9219 (Merck KGaA) | 3.5 g | 9.0 g | 10:22 | 14.63 | 4.58 |
| 85 | 1.5 g Iriodin © 9219 (Merck KGaA) | 2.0 g | 7.0 g | 10:20 | 42.86 | 14.29 |
| 86 | 1.5 g Iriodin © 9219 (Merck KGaA) | 1.5 g | 7.0 g | 10:23.3 | 50.00 | 15.00 |
| 87 | 1.5 g Iriodin © 9219 (Merck KGaA) | 1.0 g | 7.0 g | 10:28 | 60.00 | 15.79 |
| 88 | 1.5 g Iriodin © 9219 (Merck KGaA) | 0.5 g | 7.0 g | 10:35 | 75.00 | 16.67 |
| 89 | 5.0 g Iriodin © 9219 (Merck KGaA) | 0.0 g | 7.0 g | 10:14 | 100.0 | 41.67 |
| 90 | 2.0 g Iriodin © 9219 (Merck KGaA) | 3.0 g | 7.0 g | 10:14 | 40.00 | 16.67 |
| 91 | 3.8 g Iriodin © 9219 (Merck KGaA) | 1.2 g | 7.0 g | 10:14 | 76.00 | 31.67 |
| 92 | 4.3 g Iriodin © 9219 (Merck KGaA) | 0.7 g | 7.0 g | 10:14 | 86.00 | 35.83 |
| 93 | 4.5 g Iriodin © 9219 (Merck KGaA) | 0.5 g | 7.0 g | 10:14 | 90.00 | 37.50 |
| 94 | 4.8 g Iriodin © 9219 (Merck KGaA) | 0.2 g | 7.0 g | 10:14 | 96.00 | 40.00 |
| 95 | 4.9 g Iriodin © 9219 (Merck KGaA) | 0.1 g | 7.0 g | 10:14 | 98.00 | 40.83 |
| 96 | 1.5 g Iriodin © 9444 (Merck KGaA) | 3.5 g | 7.0 g | 10:14 | 30.00 | 12.50 |
| 97 | 1.0 g Iriodin © 9444 (Merck KGaA) | 3.5 g | 7.0 g | 10:15.6 | 22.22 | 8.70 |
| 98 | 0.8 g Iriodin © 9444 (Merck KGaA) | 3.5 g | 7.0 g | 10:16.3 | 18.60 | 7.08 |
| 99 | 0.6 g Iriodin © 9444 (Merck KGaA) | 3.5 g | 7.0 g | 10:17.1 | 14.63 | 5.41 |
| 100 | 1.5 g Iriodin © 9444 (Merck KGaA) | 3.5 g | 9.0 g | 10:18 | 30.00 | 10.71 |
| 101 | 1.0 g Iriodin © 9444 (Merck KGaA) | 3.5 g | 9.0 g | 10:20 | 22.22 | 7.41 |
| 102 | 0.8 g Iriodin © 9444 (Merck KGaA) | 3.5 g | 9.0 g | 10:20.9 | 18.60 | 6.02 |
| 103 | 0.6 g Iriodin © 9444 (Merck KGaA) | 3.5 g | 9.0 g | 10:22 | 14.63 | 4.58 |
| 104 | 1.5 g Iriodin © 9444 (Merck KGaA) | 2.0 g | 7.0 g | 10:20 | 42.86 | 14.29 |
| 105 | 1.5 g Iriodin © 9444 (Merck KGaA) | 1.5 g | 7.0 g | 10:23.3 | 50.00 | 15.00 |
| 106 | 1.5 g Iriodin © 9444 (Merck KGaA) | 1.0 g | 7.0 g | 10:28 | 60.00 | 15.79 |
| 107 | 1.5 g Iriodin © 9444 (Merck KGaA) | 0.5 g | 7.0 g | 10:35 | 75.00 | 16.67 |
| 108 | 5.0 g Iriodin © 9444 (Merck KGaA) | 0.0 g | 7.0 g | 10:14 | 100.0 | 41.67 |
| 109 | 2.0 g Iriodin © 9444 (Merck KGaA) | 3.0 g | 7.0 g | 10:14 | 40.00 | 16.67 |
| 110 | 3.8 g Iriodin © 9444 (Merck KGaA) | 1.2 g | 7.0 g | 10:14 | 76.00 | 31.67 |
| 111 | 4.3 g Iriodin © 9444 (Merck KGaA) | 0.7 g | 7.0 g | 10:14 | 86.00 | 35.83 |
| 112 | 4.5 g Iriodin © 9444 (Merck KGaA) | 0.5 g | 7.0 g | 10:14 | 90.00 | 37.50 |
| 113 | 4.8 g Iriodin © 9444 (Merck KGaA) | 0.2 g | 7.0 g | 10:14 | 96.00 | 40.00 |
| 114 | 4.9 g Iriodin © 9444 (Merck KGaA) | 0.1 g | 7.0 g | 10:14 | 98.00 | 40.83 |
| 115 | 1.5 g Iriodin © 9504 (Merck KGaA) | 3.5 g | 7.0 g | 10:14 | 30.00 | 12.50 |
| 116 | 1.0 g Iriodin © 9504 (Merck KGaA) | 3.5 g | 7.0 g | 10:15.6 | 22.22 | 8.70 |
| 117 | 0.8 g Iriodin © 9504 (Merck KGaA) | 3.5 g | 7.0 g | 10:16.3 | 18.60 | 7.08 |
| 118 | 0.6 g Iriodin © 9504 (Merck KGaA) | 3.5 g | 7.0 g | 10:17.1 | 14.63 | 5.41 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 119 | 1.5 g Iriodin © 9504 (Merck KGaA) | 3.5 g | 9.0 g | 10:18 | 30.00 | 10.71 |
| 120 | 1.0 g Iriodin © 9504 (Merck KGaA) | 3.5 g | 9.0 g | 10:20 | 22.22 | 7.41 |
| 121 | 0.8 g Iriodin © 9504 (Merck KGaA) | 3.5 g | 9.0 g | 10:20.9 | 18.60 | 6.02 |
| 122 | 0.6 g Iriodin © 9504 (Merck KGaA) | 3.5 g | 9.0 g | 10:22 | 14.63 | 4.58 |
| 123 | 1.5 g Iriodin © 9504 (Merck KGaA) | 2.0 g | 7.0 g | 10:20 | 42.86 | 14.29 |
| 124 | 1.5 g Iriodin © 9504 (Merck KGaA) | 1.5 g | 7.0 g | 10:23.3 | 50.00 | 15.00 |
| 125 | 1.5 g Iriodin © 9504 (Merck KGaA) | 1.0 g | 7.0 g | 10:28 | 60.00 | 15.79 |
| 126 | 1.5 g Iriodin © 9504 (Merck KGaA) | 0.5 g | 7.0 g | 10:35 | 75.00 | 16.67 |
| 127 | 5.0 g Iriodin © 9504 (Merck KGaA) | 0.0 g | 7.0 g | 10:14 | 100.0 | 41.67 |
| 128 | 2.0 g Iriodin © 9504 (Merck KGaA) | 3.0 g | 7.0 g | 10:14 | 40.00 | 16.67 |
| 129 | 3.8 g Iriodin © 9504 (Merck KGaA) | 1.2 g | 7.0 g | 10:14 | 76.00 | 31.67 |
| 130 | 4.3 g Iriodin © 9504 (Merck KGaA) | 0.7 g | 7.0 g | 10:14 | 86.00 | 35.83 |
| 131 | 4.5 g Iriodin © 9504 (Merck KGaA) | 0.5 g | 7.0 g | 10:14 | 90.00 | 37.50 |
| 132 | 4.8 g Iriodin © 9504 (Merck KGaA) | 0.2 g | 7.0 g | 10:14 | 96.00 | 40.00 |
| 133 | 4.9 g Iriodin © 9504 (Merck KGaA) | 0.1 g | 7.0 g | 10:14 | 98.00 | 40.83 |
| 134 | 1.5 g Xirallic © F60-50 (Merck KGaA) | 3.5 g | 7.0 g | 10:14 | 30.00 | 12.50 |
| 135 | 1.0 g Xirallic © F60-50 (Merck KGaA) | 3.5 g | 7.0 g | 10:15.6 | 22.22 | 8.70 |
| 136 | 0.8 g Xirallic © F60-50 (Merck KGaA) | 3.5 g | 7.0 g | 10:16.3 | 18.60 | 7.08 |
| 137 | 0.6 g Xirallic © F60-50 (Merck KGaA) | 3.5 g | 7.0 g | 10:17.1 | 14.63 | 5.41 |
| 138 | 1.5 g Xirallic © F60-50 (Merck KGaA) | 3.5 g | 9.0 g | 10:18 | 30.00 | 10.71 |
| 139 | 1.0 g Xirallic © F60-50 (Merck KGaA) | 3.5 g | 9.0 g | 10:20 | 22.22 | 7.41 |
| 140 | 0.8 g Xirallic © F60-50 (Merck KGaA) | 3.5 g | 9.0 g | 10:20.9 | 18.60 | 6.02 |
| 141 | 0.6 g Xirallic © F60-50 (Merck KGaA) | 3.5 g | 9.0 g | 10:22 | 14.63 | 4.58 |
| 142 | 1.5 g Xirallic © F60-50 (Merck KGaA) | 2.0 g | 7.0 g | 10:20 | 42.86 | 14.29 |
| 143 | 1.5 g Xirallic © F60-50 (Merck KGaA) | 1.5 g | 7.0 g | 10:23.3 | 50.00 | 15.00 |
| 144 | 1.5 g Xirallic © F60-50 (Merck KGaA) | 1.0 g | 7.0 g | 10:28 | 60.00 | 15.79 |
| 145 | 1.5 g Xirallic © F60-50 (Merck KGaA) | 0.5 g | 7.0 g | 10:35 | 75.00 | 16.67 |
| 146 | 5.0 g Xirallic © F60-50 (Merck KGaA) | 0.0 g | 7.0 g | 10:14 | 100.0 | 41.67 |
| 147 | 2.0 g Xirallic © F60-50 (Merck KGaA) | 3.0 g | 7.0 g | 10:14 | 40.00 | 16.67 |
| 148 | 3.8 g Xirallic © F60-50 (Merck KGaA) | 1.2 g | 7.0 g | 10:14 | 76.00 | 31.67 |
| 149 | 4.3 g Xirallic © F60-50 (Merck KGaA) | 0.7 g | 7.0 g | 10:14 | 86.00 | 35.83 |
| 150 | 4.5 g Xirallic © F60-50 (Merck KGaA) | 0.5 g | 7.0 g | 10:14 | 90.00 | 37.50 |
| 151 | 4.8 g Xirallic © F60-50 (Merck KGaA) | 0.2 g | 7.0 g | 10:14 | 96.00 | 40.00 |
| 152 | 4.9 g Xirallic © F60-50 (Merck KGaA) | 0.1 g | 7.0 g | 10:14 | 98.00 | 40.83 |
| 153 | 1.5 g Xirallic © F60-51 (Merck KGaA) | 3.5 g | 7.0 g | 10:14 | 30.00 | 12.50 |
| 154 | 1.0 g Xirallic © F60-51 (Merck KGaA) | 3.5 g | 7.0 g | 10:15.6 | 22.22 | 8.70 |
| 155 | 0.8 g Xirallic © F60-51 (Merck KGaA) | 3.5 g | 7.0 g | 10:16.3 | 18.60 | 7.08 |
| 156 | 0.6 g Xirallic © F60-51 (Merck KGaA) | 3.5 g | 7.0 g | 10:17.1 | 14.63 | 5.41 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 157 | 1.5 g Xirallic © F60-51 (Merck KGaA) | 3.5 g | 9.0 g | 10:18 | 30.00 | 10.71 |
| 158 | 1.0 g Xirallic © F60-51 (Merck KGaA) | 3.5 g | 9.0 g | 10:20 | 22.22 | 7.41 |
| 159 | 0.8 g Xirallic © F60-51 (Merck KGaA) | 3.5 g | 9.0 g | 10:20.9 | 18.60 | 6.02 |
| 160 | 0.6 g Xirallic © F60-51 (Merck KGaA) | 3.5 g | 9.0 g | 10:22 | 14.63 | 4.58 |
| 161 | 1.5 g Xirallic © F60-51 (Merck KGaA) | 2.0 g | 7.0 g | 10:20 | 42.86 | 14.29 |
| 162 | 1.5 g Xirallic © F60-51 (Merck KGaA) | 1.5 g | 7.0 g | 10:23.3 | 50.00 | 15.00 |
| 163 | 1.5 g Xirallic © F60-51 (Merck KGaA) | 1.0 g | 7.0 g | 10:28 | 60.00 | 15.79 |
| 164 | 1.5 g Xirallic © F60-51 (Merck KGaA) | 0.5 g | 7.0 g | 10:35 | 75.00 | 16.67 |
| 165 | 5.0 g Xirallic © F60-51 (Merck KGaA) | 0.0 g | 7.0 g | 10:14 | 100.0 | 41.67 |
| 166 | 2.0 g Xirallic © F60-51 (Merck KGaA) | 3.0 g | 7.0 g | 10:14 | 40.00 | 16.67 |
| 167 | 3.8 g Xirallic © F60-51 (Merck KGaA) | 1.2 g | 7.0 g | 10:14 | 76.00 | 31.67 |
| 168 | 4.3 g Xirallic © F60-51 (Merck KGaA) | 0.7 g | 7.0 g | 10:14 | 86.00 | 35.83 |
| 169 | 4.5 g Xirallic © F60-51 (Merck KGaA) | 0.5 g | 7.0 g | 10:14 | 90.00 | 37.50 |
| 170 | 4.8 g Xirallic © F60-51 (Merck KGaA) | 0.2 g | 7.0 g | 10:14 | 96.00 | 40.00 |
| 171 | 4.9 g Xirallic © F60-51 (Merck KGaA) | 0.1 g | 7.0 g | 10:14 | 98.00 | 40.83 |
| 172 | 1.5 g Pyrisma © M40-58 (Merck KGaA) | 3.5 g | 7.0 g | 10:14 | 30.00 | 12.50 |
| 173 | 1.0 g Pyrisma © M40-58 (Merck KGaA) | 3.5 g | 7.0 g | 10:15.6 | 22.22 | 8.70 |
| 174 | 0.8 g Pyrisma © M40-58 (Merck KGaA) | 3.5 g | 7.0 g | 10:16.3 | 18.60 | 7.08 |
| 175 | 0.6 g Pyrisma © M40-58 (Merck KGaA) | 3.5 g | 7.0 g | 10:17.1 | 14.63 | 5.41 |
| 176 | 1.5 g Pyrisma © M40-58 (Merck KGaA) | 3.5 g | 9.0 g | 10:18 | 30.00 | 10.71 |
| 177 | 1.0 g Pyrisma © M40-58 (Merck KGaA) | 3.5 g | 9.0 g | 10:20 | 22.22 | 7.41 |
| 178 | 0.8 g Pyrisma © M40-58 (Merck KGaA) | 3.5 g | 9.0 g | 10:20.9 | 18.60 | 6.02 |
| 179 | 0.6 g Pyrisma © M40-58 (Merck KGaA) | 3.5 g | 9.0 g | 10:22 | 14.63 | 4.58 |
| 180 | 1.5 g Pyrisma © M40-58 (Merck KGaA) | 2.0 g | 7.0 g | 10:20 | 42.86 | 14.29 |
| 181 | 1.5 g Pyrisma © M40-58 (Merck KGaA) | 1.5 g | 7.0 g | 10:23.3 | 50.00 | 15.00 |
| 182 | 1.5 g Pyrisma © M40-58 (Merck KGaA) | 1.0 g | 7.0 g | 10:28 | 60.00 | 15.79 |
| 183 | 1.5 g Pyrisma © M40-58 (Merck KGaA) | 0.5 g | 7.0 g | 10:35 | 75.00 | 16.67 |
| 184 | 5.0 g Pyrisma © M40-58 (Merck KGaA) | 0.0 g | 7.0 g | 10:14 | 100.0 | 41.67 |
| 185 | 2.0 g Pyrisma © M40-58 (Merck KGaA) | 3.0 g | 7.0 g | 10:14 | 40.00 | 16.67 |
| 186 | 3.8 g Pyrisma © M40-58 (Merck KGaA) | 1.2 g | 7.0 g | 10:14 | 76.00 | 31.67 |
| 187 | 4.3 g Pyrisma © M40-58 (Merck KGaA) | 0.7 g | 7.0 g | 10:14 | 86.00 | 35.83 |
| 188 | 4.5 g Pyrisma © M40-58 (Merck KGaA) | 0.5 g | 7.0 g | 10:14 | 90.00 | 37.50 |
| 189 | 4.8 g Pyrisma © M40-58 (Merck KGaA) | 0.2 g | 7.0 g | 10:14 | 96.00 | 40.00 |
| 190 | 4.9 g Pyrisma © M40-58 (Merck KGaA) | 0.1 g | 7.0 g | 10:14 | 98.00 | 40.83 |
| 191 | 4.3 g SynCrystal © Silver (Eckart GmbH) | 0.7 g | 7.0 g | 10:14 | 86.00 | 35.83 |
| 192 | 4.5 g SYMIC © B001 Silver (Eckart GmbH) | 0.5 g | 7.0 g | 10:14 | 90.00 | 37.50 |
| 193 | 1.5 g SYMIC © C001 Silver (Eckart GmbH) | 1.0 g | 7.0 g | 10:28 | 60.00 | 15.79 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 194 | 1.5 g SYMIC © C604 Silver (Eckart GmbH) | 2.0 g | 7.0 g | 10:20 | 42.86 | 14.29 |
| 195 | 1.5 g SYMIC © OEM X-fine Silver (Eckart GmbH) | 2.0 g | 7.0 g | 10:20 | 42.86 | 14.29 |
| 196 | 1.5 g SYMIC © C393 Gold (Eckart GmbH) | 2.0 g | 7.0 g | 10:20 | 42.86 | 14.29 |
| 197 | 4.3 g SYMIC © C522 Copper Earth Shade (Eckart GmbH) | 0.7 g | 7.0 g | 10:14 | 86.00 | 35.83 |
| 198 | 4.3 g SYMIC © C542 Fire Red Earth Shade (Eckart GmbH) | 0.7 g | 7.0 g | 10:14 | 86.00 | 35.83 |
| 199 | 4.3 g SYMIC © OEM Medium Space Gold (Eckart GmbH) | 0.7 g | 7.0 g | 10:14 | 86.00 | 35.83 |
| 200 | 1.5 g Magnapearl © 1000 (BASF AG) | 2.0 g | 7.0 g | 10:20 | 42.86 | 14.29 |
| 201 | 1.5 g Magnapearl © 2000 (BASF AG) | 1.0 g | 7.0 g | 10:28 | 60.00 | 15.79 |
| 202 | 3.8 g Magnapearl © 3100 (BASF AG) | 1.2 g | 7.0 g | 10:14 | 76.00 | 31.67 |
| 203 | 1.5 g Lumina © Brass 9232D (BASF AG) | 2.0 g | 7.0 g | 10:20 | 42.86 | 14.29 |
| 204 | 1.5 g Lumina © Copper 9350D (BASF AG) | 1.0 g | 7.0 g | 10:28 | 60.00 | 15.79 |
| 205 | 3.8 g Lumina © Exterior Gold 2303D (BASF AG) | 1.2 g | 7.0 g | 10:14 | 76.00 | 31.67 |
| 206 | 4.3 g Lumina © Russet 9450D (BASF AG) | 0.7 g | 7.0 g | 10:14 | 86.00 | 35.83 |
| 207 | 1.5 g Lumina © Royal Copper (BASF AG) | 2.0 g | 7.0 g | 10:20 | 42.86 | 14.29 |
| 208 | 1.5 g Lumina © Royal Magenta (BASF AG) | 1.5 g | 7.0 g | 10:23.3 | 50.00 | 15.00 |
| 209 | 1.5 g Lumina © Royal Blue (BASF AG) | 1.0 g | 7.0 g | 10:28 | 60.00 | 15.79 |
| 210 | 1.5 g Exterior Polar White KC9119-SW (Fujian Kuncai Fine Chemicals Co., Ltd.) | 2.0 g | 7.0 g | 10:20 | 42.86 | 14.29 |
| 211 | 1.5 g Exterior Sterling White KC9103-SW (Fujian Kuncai Fine Chemicals Co., Ltd.) | 1.0 g | 7.0 g | 10:28 | 60.00 | 15.79 |
| 212 | 1.5 g Exterior Fine Gold Satin KC9201-SW (Fujian Kuncai Fine Chemicals Co., Ltd.) | 1.0 g | 7.0 g | 10:28 | 60.00 | 15.79 |
| 213 | 1.5 g Exterior Platinum Pearl KC9205-SW (Fujian Kuncai Fine Chemicals Co., Ltd.) | 1.0 g | 7.0 g | 10:28 | 60.00 | 15.79 |
| 214 | 1.5 g Exterior Gold Pearl KC9300-SW (Fujian Kuncai Fine Chemicals Co., Ltd.) | 1.0 g | 7.0 g | 10:28 | 60.00 | 15.79 |
| 215 | 1.5 g Exterior Royal Gold KC9303-SW (Fujian Kuncai Fine Chemicals Co., Ltd.) | 1.0 g | 7.0 g | 10:28 | 60.00 | 15.79 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 216 | 3.8 g Exterior Royal Gold Satin KC9323-SW (Fujian Kuncai Fine Chemicals Co., Ltd.) | 1.2 g | 7.0 g | 10:14 | 76.00 | 31.67 |
| 217 | 3.8 g Exterior Bright Gold KC9307-SW (Fujian Kuncai Fine Chemicals Co., Ltd.) | 1.2 g | 7.0 g | 10:14 | 76.00 | 31.67 |
| 218 | 3.8 g Exterior Bronze KC9502-SW (Fujian Kuncai Fine Chemicals Co., Ltd.) | 1.2 g | 7.0 g | 10:14 | 76.00 | 31.67 |
| 219 | 4.3 g Exterior Wine Red KC9504-SW (Fujian Kuncai Fine Chemicals Co., Ltd.) | 0.7 g | 7.0 g | 10:14 | 86.00 | 35.83 |
| 220 | 4.3 g Exterior Ruby KC9508-SW (Fujian Kuncai Fine Chemicals Co., Ltd.) | 0.7 g | 7.0 g | 10:14 | 86.00 | 35.83 |
| 221 | 1.5 g ADAMAS © A-100D (CQV Co., Ltd) | 2.0 g | 7.0 g | 10:20 | 42.86 | 14.29 |
| 222 | 1.5 g ADAMAS © A-100D (CQV Co., Ltd) | 1.5 g | 7.0 g | 10:23.3 | 50.00 | 15.00 |
| 223 | 1.5 g ADAMAS © A-100D (CQV Co., Ltd) | 1.0 g | 7.0 g | 10:28 | 60.00 | 15.79 |
| 224 | 3.8 g ADAMAS © A-100D (CQV Co., Ltd) | 1.2 g | 7.0 g | 10:14 | 76.00 | 31.67 |
| 225 | 4.3 g ADAMAS © A-100D (CQV Co., Ltd) | 0.7 g | 7.0 g | 10:14 | 86.00 | 35.83 |
| 226 | 4.5 g ADAMAS © A-100D (CQV Co., Ltd) | 0.5 g | 7.0 g | 10:14 | 90.00 | 37.50 |
| 227 | 3.8 g ADAMAS © A-901K Splendor White (CQV Co., Ltd) | 1.2 g | 7.0 g | 10:14 | 76.00 | 31.67 |
| 228 | 1.5 g ADAMAS © A-901S Dazzling White (CQV Co., Ltd) | 2.0 g | 7.0 g | 10:20 | 42.86 | 14.29 |
| 229 | 1.5 g ADAMAS © A-901S Dazzling White (CQV Co., Ltd) | 1.0 g | 7.0 g | 10:28 | 60.00 | 15.79 |
| 230 | 4.5 g ADAMAS © A-901S Dazzling White (CQV Co., Ltd) | 0.5 g | 7.0 g | 10:14 | 90.00 | 37.50 |
| 231 | 1.5 g ADAMAS © A-901K Splendor Gold (CQV Co., Ltd) | 2.0 g | 7.0 g | 10:20 | 42.86 | 14.29 |
| 232 | 1.5 g ADAMAS © A-901K Splendor Gold (CQV Co., Ltd) | 1.0 g | 7.0 g | 10:28 | 60.00 | 15.79 |
| 233 | 4.5 g ADAMAS © A-901K Splendor Gold (CQV Co., Ltd) | 0.5 g | 7.0 g | 10:14 | 90.00 | 37.50 |
| 234 | 1.5 g ADAMAS © A-701S Dazzling Gold (CQV Co., Ltd) | 2.0 g | 7.0 g | 10:20 | 42.86 | 14.29 |
| 235 | 1.5 g ADAMAS © A-701S Dazzling Gold (CQV Co., Ltd) | 1.0 g | 7.0 g | 10:28 | 60.00 | 15.79 |
| 236 | 4.5 g ADAMAS © A-701S Dazzling Gold (CQV Co., Ltd) | 0.5 g | 7.0 g | 10:14 | 90.00 | 37.50 |
| 237 | 1.5 g ADAMAS © A-741S Dazzling Red (CQV Co., Ltd) | 1.0 g | 7.0 g | 10:28 | 60.00 | 15.79 |
| 238 | 1.5 g ADAMAS © A-781K Splendor Blue (CQV Co., Ltd) | 1.0 g | 7.0 g | 10:28 | 60.00 | 15.79 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 239 | 1.5 g ADAMAS © A-781S Dazzling Blue (CQV Co., Ltd) | 1.0 g | 7.0 g | 10:28 | 60.00 | 15.79 |
| 240 | 1.5 g ADAMAS © A-620S Dazzling Bronze (CQV Co., Ltd) | 2.0 g | 7.0 g | 10:20 | 42.86 | 14.29 |
| 241 | 1.5 g ADAMAS © A-620S Dazzling Bronze (CQV Co., Ltd) | 1.0 g | 7.0 g | 10:28 | 60.00 | 15.79 |
| 242 | 4.5 g ADAMAS © A-620S Dazzling Bronze (CQV Co., Ltd) | 0.5 g | 7.0 g | 10:14 | 90.00 | 37.50 |
| 243 | 1.5 g ADAMAS © A-640K Splendor Copper (CQV Co., Ltd) | 2.0 g | 7.0 g | 10:20 | 42.86 | 14.29 |
| 244 | 1.5 g ADAMAS © A-640K Splendor Copper (CQV Co., Ltd) | 1.0 g | 7.0 g | 10:28 | 60.00 | 15.79 |
| 245 | 4.5 g ADAMAS © A-640K Splendor Copper (CQV Co., Ltd) | 0.5 g | 7.0 g | 10:14 | 90.00 | 37.50 |
| 246 | 1.5 g ADAMAS © A-640S Dazzling Copper (CQV Co., Ltd) | 2.0 g | 7.0 g | 10:20 | 42.86 | 14.29 |
| 247 | 1.5 g ADAMAS © A-640S Dazzling Copper (CQV Co., Ltd) | 1.0 g | 7.0 g | 10:28 | 60.00 | 15.79 |
| 248 | 4.5 g ADAMAS © A-640S Dazzling Copper (CQV Co., Ltd) | 0.5 g | 7.0 g | 10:14 | 90.00 | 37.50 |
| 249 | 1.5 g ADAMAS © A-660K Splendor Russet (CQV Co., Ltd) | 2.0 g | 7.0 g | 10:20 | 42.86 | 14.29 |
| 250 | 1.5 g ADAMAS © A-660K Splendor Russet (CQV Co., Ltd) | 1.0 g | 7.0 g | 10:28 | 60.00 | 15.79 |
| 251 | 4.5 g ADAMAS © A-660K Splendor Russet (CQV Co., Ltd) | 0.5 g | 7.0 g | 10:14 | 90.00 | 37.50 |
| 252 | 3.8 g ADAMAS © A-660S Dazzling Russet (CQV Co., Ltd) | 1.2 g | 7.0 g | 10:14 | 76.00 | 31.67 |
| 253 | 3.8 g CHAOS © C-901M Rutile Ultra Silk (CQV Co., Ltd) | 1.2 g | 7.0 g | 10:14 | 76.00 | 31.67 |
| 254 | 3.8 g CHAOS © C-901D Rutile Fine White (CQV Co., Ltd) | 1.2 g | 7.0 g | 10:14 | 76.00 | 31.67 |
| 255 | 3.8 g CHAOS © C-900D Fine White (CQV Co., Ltd) | 1.2 g | 7.0 g | 10:14 | 76.00 | 31.67 |
| 256 | 3.8 g CHAOS © C-907K Skye White (CQV Co., Ltd) | 1.2 g | 7.0 g | 10:14 | 76.00 | 31.67 |
| 257 | 3.8 g CHAOS © C-901K Splendor White (CQV Co., Ltd) | 1.2 g | 7.0 g | 10:14 | 76.00 | 31.67 |
| 258 | 3.8 g CHAOS © C-901S Rutile Dazzling Standard (CQV Co., Ltd) | 1.2 g | 7.0 g | 10:14 | 76.00 | 31.67 |
| 259 | 3.8 g CHAOS © C-900S Dazzling Standard (CQV Co., Ltd) | 1.2 g | 7.0 g | 10:14 | 76.00 | 31.67 |
| 260 | 1.5 g CHAOS © C-902S Super White (CQV Co., Ltd) | 1.0 g | 7.0 g | 10:28 | 60.00 | 15.79 |
| 261 | 1.5 g CHAOS © C-109S Super Pearl (CQV Co., Ltd) | 1.0 g | 7.0 g | 10:28 | 60.00 | 15.79 |
| 262 | 1.5 g CHAOS © C-109B Shimmering White (CQV Co., Ltd) | 1.0 g | 7.0 g | 10:28 | 60.00 | 15.79 |
| 263 | 1.5 g CHAOS © C-901E Glitter Pearl (CQV Co., Ltd) | 1.0 g | 7.0 g | 10:28 | 60.00 | 15.79 |

TABLE 1-continued

| Example No. | Pearlescent pigment | Frit | Printing oil | Pasting ratio | $W_{pig}$ in the solid | $W_{pig}$ in the paste |
|---|---|---|---|---|---|---|
| 264 | 1.5 g FERRIUS © F-620K Splendor Bronze (CQV Co., Ltd) | 2.0 g | 7.0 g | 10:20 | 42.86 | 14.29 |
| 265 | 1.5 g FERRIUS © F-630K Splendor Orange (CQV Co., Ltd) | 1.0 g | 7.0 g | 10:28 | 60.00 | 15.79 |
| 266 | 4.5 g FERRIUS © F-640K Splendor Copper (CQV Co., Ltd) | 0.5 g | 7.0 g | 10:14 | 90.00 | 37.50 |
| 267 | 1.5 g FERRIUS © F-660K Splendor Russet (CQV Co., Ltd) | 2.0 g | 7.0 g | 10:20 | 42.86 | 14.29 |
| 268 | 1.5 g FERRIUS © F-620P Crystal Bronze (CQV Co., Ltd) | 1.0 g | 7.0 g | 10:28 | 60.00 | 15.79 |
| 269 | 4.5 g FERRIUS © F-630P Crystal Orange (CQV Co., Ltd) | 0.5 g | 7.0 g | 10:14 | 90.00 | 37.50 |
| 270 | 1.5 g FERRIUS © F-640P Crystal Copper (CQV Co., Ltd) | 2.0 g | 7.0 g | 10:20 | 42.86 | 14.29 |
| 271 | 1.5 g FERRIUS © F-660P Crystal Russet (CQV Co., Ltd) | 1.0 g | 7.0 g | 10:28 | 60.00 | 15.79 |
| 272 | 3.8 g Magchrom © N-5001C Natural Corona Gold (CQV Co., Ltd) | 1.2 g | 7.0 g | 10:14 | 76.00 | 31.67 |
| 273 | 3.8 g Magchrom © N-5001S Natural Dazzling Gold (CQV Co., Ltd) | 1.2 g | 7.0 g | 10:14 | 76.00 | 31.67 |
| 274 | 3.8 g Magchrom © S-7801C Corona Blue (CQV Co., Ltd) | 1.2 g | 7.0 g | 10:14 | 76.00 | 31.67 |
| 275 | 3.8 g REFLEX © RCN-1008S Snow White Pearl (CQV Co., Ltd) | 1.2 g | 7.0 g | 10:14 | 76.00 | 31.67 |

The pearlescent pigments used in the table are all commercially available and have the following composition (in the "Particle size" column, the $d_{10}$-$d_{90}$ value is measured using a Malvern is indicated in each case):

| Trade name | Manufacturer | Substrate | Coating | Particle size [μm] |
|---|---|---|---|---|
| Xirallic © Crystal Silver | Merck KGaA | $Al_2O_3$ | $TiO_2$ | 5-35 |
| Iriodin © 103 | Merck KGaA | Natural mica | $TiO_2$ | 10-60 |
| Iriodin © 305 | Merck KGaA | Natural mica | $Fe_2O_3$ and $TiO_2$ | 10-60 |
| Iriodin © 4504 Lava Red | Merck KGaA | $SiO_2$ | $Fe_2O_3$ | 5-50 |
| Iriodin © 9219 | Merck KGaA | Natural mica | $TiO_2$ | 10-60 |
| Iriodin © 9444 | Merck KGaA | Natural mica | $Cr_2O_3$ | 5-40 |
| Iriodin © 9504 | Merck KGaA | Natural mica | $Fe_2O_3$ | 10-60 |
| Xirallic © F60-50 | Merck KGaA | $Al_2O_3$ | $Fe_2O_3$ | 5-35 |
| Xirallic © F60-51 | Merck KGaA | $Al_2O_3$ | $Fe_2O_3$ | 5-35 |
| Pyrisma © M40-58 | Merck KGaA | Natural mica | $Fe_2O_3$ and $TiO_2$ | 5-40 |
| SynCrystal © Silver | Eckart GmbH | Synthetic mica | $TiO_2$ | 10-50 |
| SYMIC © B001 Silver | Eckart GmbH | Synthetic mica | $TiO_2$ | 5-25 |
| SYMIC © C001 Silver | Eckart GmbH | Synthetic mica | $TiO_2$ | 10-40 |
| SYMIC © C604 Silver | Eckart GmbH | Synthetic mica | $TiO_2$ | 10-40 |
| SYMIC © OEM X-fine Silver | Eckart GmbH | Synthetic mica | $TiO_2$ | 3-15 |
| SYMIC © C393 Gold | Eckart GmbH | Synthetic mica | $Fe_2O_3$ and $TiO_2$ | 10-40 |
| SYMIC © C522 Copper Earth Shade | Eckart GmbH | Synthetic mica | $Fe_2O_3$ | 10-40 |
| SYMIC © C542 Fire Red Earth Shade | Eckart GmbH | Synthetic mica | $Fe_2O_3$ | 10-40 |
| SYMIC © OEM Medium Space Gold | Eckart GmbH | Synthetic mica | $Fe_2O_3$ and $TiO_2$ | 12-38 |
| Magnapearl © 1000 | BASF AG | Natural mica | $TiO_2$ | 6-48 |
| Magnapearl © 2000 | BASF AG | Natural mica | $TiO_2$ | 5-25 |
| Magnapearl © 3100 | BASF AG | Natural mica | $TiO_2$ | 2-10 |

| Trade name | Manufacturer | Substrate | Coating | Particle size [μm] |
|---|---|---|---|---|
| Lumina © Brass 9232D | BASF AG | Natural mica | $Fe_2O_3$ and $TiO_2$ | 10-48 |
| Lumina © Copper 9350D | BASF AG | Natural mica | $Fe_2O_3$ | 8-48 |
| Lumina © Exterior Gold 2303D | BASF AG | Natural mica | $TiO_2$ | 8-48 |
| Lumina © Russet 9450D | BASF AG | Natural mica | $Fe_2O_3$ | 8-48 |
| Lumina © Royal Copper | BASF AG | Natural mica | $TiO_2$ | 10-34 |
| Lumina © Royal Magenta | BASF AG | Natural mica | $TiO_2$ | 10-34 |
| Lumina © Royal Blue | BASF AG | Natural mica | $TiO_2$ | 10-34 |
| Exterior Polar White KC9119-SW | Fujian Kuncai Fine Chemicals Co., Ltd. | Natural mica | $TiO_2$ | 5-25 |
| Exterior Sterling White KC9103-SW | Fujian Kuncai Fine Chemicals Co., Ltd. | Natural mica | $TiO_2$ | 10-45 |
| Exterior Fine Gold Satin KC9201-SW | Fujian Kuncai Fine Chemicals Co., Ltd. | Natural mica | $TiO_2$ | 5-25 |
| Exterior Platinum Pearl KC9205-SW | Fujian Kuncai Fine Chemicals Co., Ltd. | Natural mica | $TiO_2$ | 10-45 |
| Exterior Royal Gold KC9303-SW | Fujian Kuncai Fine Chemicals Co., Ltd. | Natural mica | $Fe_2O_3$ and $TiO_2$ | 10-45 |
| Exterior Royal Gold Satin KC9323-SW | Fujian Kuncai Fine Chemicals Co., Ltd. | Natural mica | $Fe_2O_3$ and $TiO_2$ | 5-25 |
| Exterior Bright Gold KC9307-SW | Fujian Kuncai Fine Chemicals Co., Ltd. | Natural mica | $Fe_2O_3$ and $TiO_2$ | 10-60 |
| Exterior Brown KC9502-SW | Fujian Kuncai Fine Chemicals Co., Ltd. | Natural mica | $Fe_2O_3$ | 8-45 |
| Exterior Wine Red KC9504-SW | Fujian Kuncai Fine Chemicals Co., Ltd. | Natural mica | $Fe_2O_3$ | 8-45 |
| Exterior Ruby KC9508-SW | Fujian Kuncai Fine Chemicals Co., Ltd. | Natural mica | $Fe_2O_3$ | 8-45 |
| ADAMAS © A-100D | CQV Co., Ltd. | $Al_2O_3$ | $TiO_2$ | 3-30 |
| ADAMAS © A-901K Splendor White | CQV Co., Ltd. | $Al_2O_3$ | $TiO_2$ | 5-30 |
| ADAMAS © A-901S Dazzling White | CQV Co., Ltd. | $Al_2O_3$ | $TiO_2$ | 9-45 |
| ADAMAS © A-901K Splendor Gold | CQV Co., Ltd. | $Al_2O_3$ | $TiO_2$ | 5-30 |
| ADAMAS © A-701S Dazzling Gold | CQV Co., Ltd. | $Al_2O_3$ | $TiO_2$ | 9-45 |
| ADAMAS © A-741S Dazzling Red | CQV Co., Ltd. | $Al_2O_3$ | $TiO_2$ | 9-45 |
| ADAMAS © A-781K Splendor Blue | CQV Co., Ltd. | $Al_2O_3$ | $TiO_2$ | 5-30 |
| ADAMAS © A-781S Dazzling Blue | CQV Co., Ltd. | $Al_2O_3$ | $TiO_2$ | 9-45 |
| ADAMAS © A-620S Dazzling Bronze | CQV Co., Ltd. | $Al_2O_3$ | $Fe_2O_3$ | 9-45 |
| ADAMAS © A-640S Dazzling Copper | CQV Co., Ltd. | $Al_2O_3$ | $Fe_2O_3$ | 9-45 |
| ADAMAS © A-660S Dazzling Russet | CQV Co., Ltd. | $Al_2O_3$ | $Fe_2O_3$ | 9-45 |
| CHAOS © C-901M Rutile Ultra Silk | CQV Co., Ltd. | Synthetic mica | $TiO_2$ | 3-17 |
| CHAOS © C-901D Rutile Fine White | CQV Co., Ltd. | Synthetic mica | $TiO_2$ | 5-25 |
| CHAOS © C-900D Fine White | CQV Co., Ltd. | Synthetic mica | $TiO_2$ | 5-25 |
| CHAOS © C-907K Sky White | CQV Co., Ltd. | Synthetic mica | $TiO_2$ | 5-35 |
| CHAOS © C-901K Splendor White | CQV Co., Ltd. | Synthetic mica | $TiO_2$ | 5-35 |
| CHAOS © C-901S Rutile Dazzling Standard | CQV Co., Ltd. | Synthetic mica | $TiO_2$ | 9-45 |
| CHAOS © C-900S Dazzling Standard | CQV Co., Ltd. | Synthetic mica | $TiO_2$ | 9-45 |
| CHAOS © C-902S Super White | CQV Co., Ltd. | Synthetic mica | $TiO_2$ | 9-45 |
| CHAOS © C-109S Super Pearl | CQV Co., Ltd. | Synthetic mica | $TiO_2$ | 9-41 |
| CHAOS © C-109B Shimmering White | CQV Co., Ltd. | Synthetic mica | $TiO_2$ | 13-60 |
| CHAOS © C-901E Glitter Pearl | CQV Co., Ltd. | Synthetic mica | $TiO_2$ | 17-100 |
| FERRIUS © F-620K Splendor Bronze | CQV Co., Ltd. | Synthetic mica | $Fe_2O_3$ | 5-35 |
| FERRIUS © F-630K Splendor Orange | CQV Co., Ltd. | Synthetic mica | $Fe_2O_3$ | 5-35 |
| FERRIUS © F-640K Splendor Copper | CQV Co., Ltd. | Synthetic mica | $Fe_2O_3$ | 5-35 |
| FERRIUS © F-660K Splendor Russet | CQV Co., Ltd. | Synthetic mica | $Fe_2O_3$ | 5-35 |
| FERRIUS © F-620P Crystal Bronze | CQV Co., Ltd. | Synthetic mica | $Fe_2O_3$ | 25-150 |
| FERRIUS © F-630P Crystal Orange | CQV Co., Ltd. | Synthetic mica | $Fe_2O_3$ | 25-150 |
| FERRIUS © F-640P Crystal Copper | CQV Co., Ltd. | Synthetic mica | $Fe_2O_3$ | 25-150 |
| FERRIUS © F-660P Crystal Russet | CQV Co., Ltd. | Synthetic mica | $Fe_2O_3$ | 25-150 |
| Magchrom © N-5001C Natural Corona Gold | CQV Co., Ltd. | Nat. mica | $TiO_2$ | 7-30 |
| Magchrom © N-5001S Natural Dazzling Gold | CQV Co., Ltd. | Nat. mica | $TiO_2$ | 9-45 |
| Magchrom © S-7801C Corona Blue | CQV Co., Ltd. | Synthetic mica | $TiO_2$ | 7-27 |

The following steps 2-4 are independent of the composition of the printing paste.

2) Printing of the Tiles

The printing paste obtained can be applied to tiles by standard printing processes, slip processes, spray application or transfer printing. In all cases, the printed tile is dried in a drying cabinet or fume hood at temperatures of 60-110° C. in order to evaporate the solvent present in the printing oil. In the examples according to the invention, the printing paste is applied to the tiles by means of doctor blade and screen printing.

3) Firing of the Printed Tiles

The printed and dried tiles are then fired in a firing furnace by means of a temperature profile in accordance with FIG. 6.

180 min: heating to 1100° C.,
3 min: holding at 1100° C.,
120 min: rapid cooling to 600° C.,
300 min: slow cooling to room temperature.

The temperature program as a function of time is depicted in FIG. 6.

The glazed tiles of Examples 1 to 275 are distinguished by the fact that the desired optical effects are stable and accessible in a reproducible manner in high-temperature applications >1100° C.

The preceding examples can be repeated with similar success by substituting the generically or specifically described reactants and/or operating conditions of this invention for those used in the preceding examples.

Figure 1:
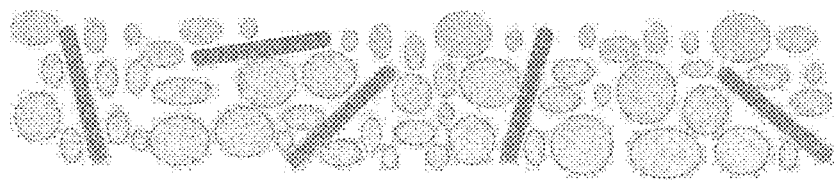
FIGS. 1 and 2 show sectional side views through a pigmented frit layer before the firing operation, the particles of the frit are represented as round or oval particles and the pearlescent pigments are represented as rods.
Figure 2:
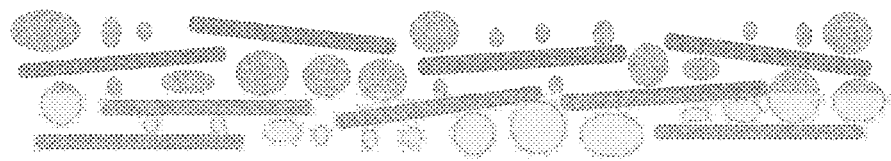
Figure 3:
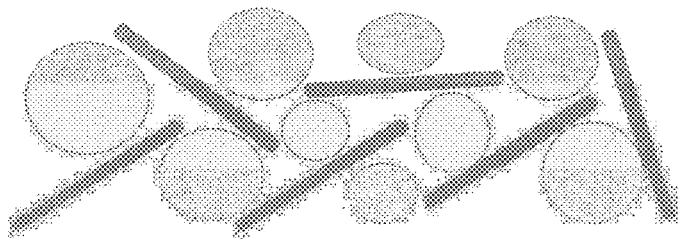
FIGS. 3-5 diagrammatically show the plane-parallel alignment of the pearlescent pigments in the glaze.
Figure 4:
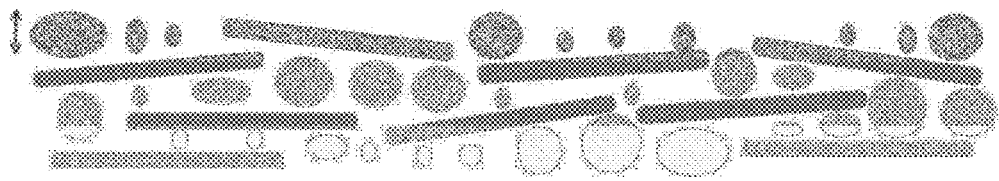
Figure 5:
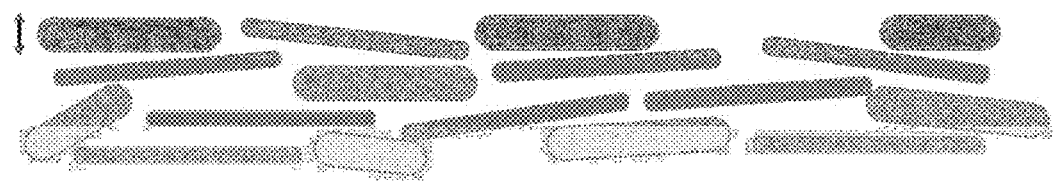
Figure 6:
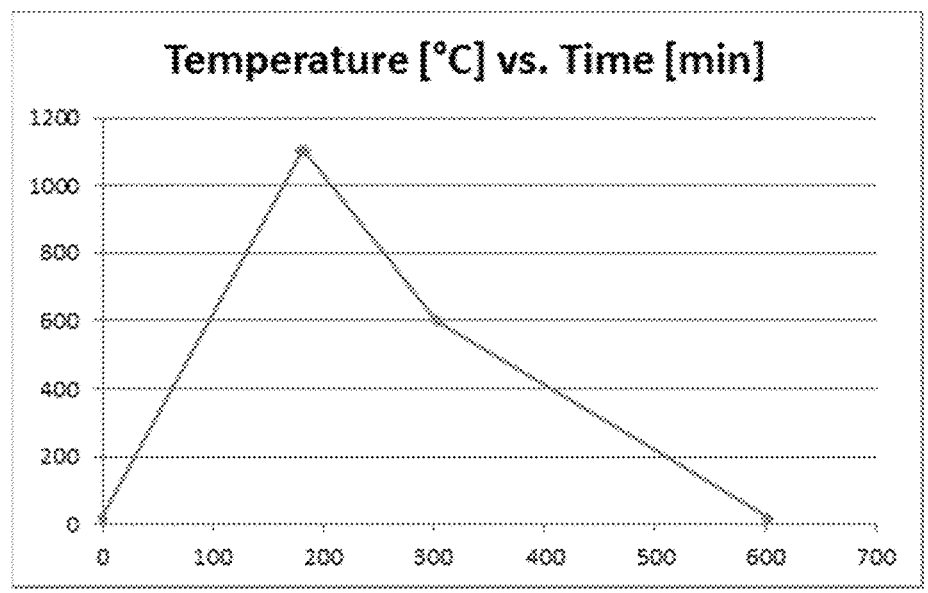
FIG. 6 shows the temperature profile used for firing the printed and dried tiles in the Examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A pigment/frit mixture, comprising a mixture of a pearlescent pigment and a frit in the form of particles, wherein the proportion of pearlescent pigment in the mixture is 5-95% by weight and the frit comprises at least 5% by weight of $Al_2O_3$, based on the weight of the frit, wherein the pearlescent pigment is based on a flake substrate and the ratio of the thickness of the flake substrate to the size of the frit particles is from 0.01 to 0.2.

2. The pigment/frit mixture according to claim 1, wherein the flake substrate is selected from: synthetic mica flakes, natural mica flakes, $Al_2O_3$ flakes, $SiO_2$ flakes, $Fe_2O_3$ flakes, $B_4C$ flakes, $TiO_2$ flakes, SiC flakes, BN flakes and graphite flakes.

3. The pigment/frit mixture according to claim 1, wherein the flake substrate is covered with one or more layers of metal oxide(s), metal sulfides, rare-earth metal oxides and/or metal(s) or mixtures thereof.

4. The pigment/frit mixture according to claim 3, wherein the flake substrate is covered on the surface with one or more layers selected from: $TiO_2$, $Fe_2O_3$, $ZrO_2$, $SnO_2$, $TiO_2/Fe_2O_3$, $Fe_2TiO_5$, $FeTiO_3$, FeOOH, $Fe_3O_4$, $Cr_2O_3$ and $TiO_x$, where x=1.50-1.95.

5. The pigment/frit mixture according to claim 1, wherein the flake substrate has a particle thickness of 0.05-5.0 μm.

6. The pigment/frit mixture according to claim 1, wherein the frit has a particle size of 1-500 μm.

7. The pigment/frit mixture according to claim 1, wherein the frit comprises CaO, $Na_2O$, $K_2O$, BaO, $SiO_2$ or $B_2O_3$.

8. The pigment/frit mixture according to claim 1, wherein the frit comprises ≥5% by weight of $Al_2O_3$ and ≥50% by weight of $SiO_2$, based on the weight of the frit, where the totality of all constituents of the frit is 100%.

9. The pigment/frit mixture according to claim 1, wherein the pearlescent pigment is selected from pigments having one of the following combinations of substrate and layer(s) thereon:
substrate flake+$TiO_2$;
substrate flake+$Fe_2O_3$;
substrate flake+$Fe_3O_4$;
substrate flake+$TiO_2/Fe_2O_3$
substrate flake+$FeTiO_3$;
substrate flake+$Fe_2TiO_5$
substrate flake+$ZrO_2$;
substrate flake+ZnO;
substrate flake+$SnO_2$;
substrate flake+$Cr_2O_3$;
substrate flake+$Ce_2O_3$;
substrate flake+$TiO_x$ (reduced), where x=1.50-1.95;
substrate flake+$TiO_2$+$Fe_2O_3$;
substrate flake+$TiO_2$+$Fe_3O_4$;
substrate flake+$Fe_2O_3$+$TiO_2$;
substrate flake+$TiO_2$+$SiO_2$+$TiO_2$;
substrate flake+$TiO_2$+$SnO_2$+$TiO_2$;
substrate flake+$TiO_2$+$Al_2O_3$+$TiO_2$;
substrate flake+$Fe_2O_3$+$SiO_2$+$TiO_2$;
substrate flake+$TiO_2/Fe_2O_3$+$SiO_2$+$TiO_2$;
substrate flake+$TiO_2/Fe_2O_3$+$SiO_2$+$TiO_2/Fe_2O_3$;
substrate flake+$TiO_2/Fe_2O_3$+$SiO_2$+$TiO_2$+$TiO_2/Fe_2O_3$;
substrate flake+$TiO_2$+$SiO_2$+$TiO_2/Fe_2O_3$;
substrate flake+$TiO_2$+$SiO_2$;
substrate flake+$TiO_2$+$Al_2O_3$;
substrate flake+$TiO_2$+MgO×$SiO_2$+$TiO_2$;
substrate flake+$Fe_2O_3$+MgO×$SiO_2$+$TiO_2$;
substrate flake+$TiO_2/Fe_2O_3$+MgO×$SiO_2$+$TiO_2$;
substrate flake+$TiO_2/Fe_2O_3$+MgO×$SiO_2$+$TiO_2/Fe_2O_3$;
substrate flake+$TiO_2/Fe_2O_3$+MgO×$SiO_2$+$TiO_2$+$TiO_2/Fe_2O_3$;
substrate flake+$TiO_2$+MgO×$SiO_2$+$TiO_2/Fe_2O_3$;
substrate flake+$SnO_2$+$TiO_2$+$SiO_2$+$SnO_2$+$TiO_2$;
substrate flake+$SnO_2$+$TiO_2$+$SnO_2$+$TiO_2$;
substrate flake+$SnO_2$+$TiO_2$+$Fe_2O_3$+$SiO_2$+$SnO_2$+$TiO_2$+$Fe_2O_3$;
substrate flake+$Fe_2O_3$+$SnO_2$+$TiO_2$;
substrate flake+$Fe_2O_3$+$SnO_2$+$Fe_2O_3$;
substrate flake+$TiO_2$+$SnO_2$+$TiO_2$;
substrate flake+$TiO_2/Fe_2O_3$+$SnO_2$+$TiO_2$;
substrate flake+$TiO_2/Fe_2O_3$+$SnO_2$+$TiO_2/Fe_2O_3$;
substrate flake+$SnO_2$+$TiO_2$+$Fe_2O_3$+$SnO_2$+$TiO_2$+$Fe_2O_3$;
substrate flake+$Fe_2TiO_5$+$SnO_2$+$Fe_2TiO_5$;
substrate flake+$Fe_2TiO_5$+$SiO_2$+$Fe_2TiO_5$.

10. The pigment/frit mixture according to claim 1, wherein the pearlescent pigment is on a flake substrate and has a first low-refractive-index layer (=LRL) on the flake substrate comprising $Al_2O_3$, $SiO_2$, zirconium silicate $ZrSiO_4$, mullite $3Al_2O_3×2SiO_2$ or $2Al_2O_3×SiO_2$ (sintered or fused mullite) or alkaline-earth metal silicate ($MSiO_3$, where M=$Mg^{2+}$, $Ca^{2+}$, $Sr^{2+}$or $Ba^{2+}$, or $M_2Si_3O_8$, where M=$Mg^{2+}$, $Ca^{2+}$, $Sr^{2+}$or $Ba^{2+}$).

11. The pigment/frit mixture according to claim 10, wherein the pearlescent pigment is selected from pigments having one of the following combinations of substrate and layer(s) thereon: substrate flake+LRL+$TiO_2$;
substrate flake+LRL+$Fe_2O_3$;
substrate flake+LRL+$Fe_3O_4$;
substrate flake+LRL+$TiO_2/Fe_2O_3$;
substrate flake+LRL+$FeTiO_3$;
substrate flake+LRL+$Fe_2TiO_5$;
substrate flake+LRL+$ZrO_2$;
substrate flake+LRL+ZnO;
substrate flake+LRL+$SnO_2$;
substrate flake+LRL+$Cr_2O_3$;
substrate flake+LRL+$Ce_2O_3$;
substrate flake+LRL+$TiO_x$ (reduced), where x=1.50-1.95;
substrate flake+LRL+$TiO_2$+$Fe_2O_3$;
substrate flake+LRL+$TiO_2$+$Fe_3O_4$;
substrate flake+LRL+$Fe_2O_3$+$TiO_2$;
substrate flake+LRL+$TiO_2$+$SiO_2$+$TiO_2$;
substrate flake+LRL+$TiO_2$+$SnO_2$+$TiO_2$;
substrate flake+LRL+$TiO_2$+$Al_2O_3$+$TiO_2$;
substrate flake+LRL+$Fe_2O_3$+$SiO_2$+$TiO_2$;
substrate flake+LRL+$TiO_2/Fe_2O_3$+$SiO_2$+$TiO_2$;
substrate flake+LRL+$TiO_2/Fe_2O_3$+$SiO_2$+$TiO_2/Fe_2O_3$;
substrate flake+LRL+$TiO_2/Fe_2O_3$+$SiO_2$+$TiO_2$+$TiO_2/Fe_2O_3$;
substrate flake+LRL+$TiO_2$+$SiO_2$+$TiO_2/Fe_2O_3$;
substrate flake+LRL+$TiO_2$+$SiO_2$;
substrate flake+LRL+$TiO_2$+$Al_2O_3$;
substrate flake+LRL+$TiO_2$+MgO×$SiO_2$+$TiO_2$;

substrate flake+LRL+Fe$_2$O$_3$+MgOxSiO$_2$+TiO$_2$;
substrate flake+LRL+TiO$_2$/Fe$_2$O$_3$+MgOxSiO$_2$+TiO$_2$;
substrate flake+LRL+TiO$_2$/Fe$_2$O$_3$+MgOxSiO$_2$+TiO$_2$/Fe$_2$O$_3$;
substrate flake+LRL+TiO$_2$/Fe$_2$O$_3$+MgOxSiO$_2$+TiO$_2$+TiO$_2$/Fe$_2$O$_3$;
substrate flake+LRL+TiO$_2$+MgOxSiO$_2$+TiO$_2$/Fe$_2$O$_3$;
substrate flake+LRL+SnO$_2$+TiO$_2$+SiO$_2$+SnO$_2$+TiO$_2$;
substrate flake+LRL+SnO$_2$+TiO$_2$+SnO$_2$+TiO$_2$;
substrate flake+LRL+SnO$_2$+TiO$_2$+Fe$_2$O$_3$+SiO$_2$+SnO$_2$+TiO$_2$+Fe$_2$O$_3$;
substrate flake+LRL+Fe$_2$O$_3$+SnO$_2$+TiO$_2$;
substrate flake+LRL+Fe$_2$O$_3$+SnO$_2$+Fe$_2$O$_3$;
substrate flake+LRL+TiO$_2$+SnO$_2$+TiO$_2$;
substrate flake+LRL+TiO$_2$/Fe$_2$O$_3$+SnO$_2$+TiO$_2$;
substrate flake+LRL+TiO$_2$/Fe$_2$O$_3$+SnO$_2$+TiO$_2$/Fe$_2$O$_3$;
substrate flake+LRL+SnO$_2$+TiO$_2$+Fe$_2$O$_3$+SnO$_2$+TiO$_2$+Fe$_2$O$_3$;
substrate flake+LRL+Fe$_2$TiO$_5$+SnO$_2$+Fe$_2$TiO$_5$;
substrate flake+LRL+Fe$_2$TiO$_5$+SiO$_2$+Fe$_2$TiO$_5$.

12. An unfired or fired brick, unfired or fired earthenware, unfired or fired ceramicware or a ceramic glaze, which comprises a pigment/frit mixture according to claim 1.

13. A decorative tile, which comprises a pigment/frit mixture according to claim 1.

14. A porcelain glaze, which comprises a pigment/frit mixture according to claim 1.

15. A composition comprising the pigment/frit mixture according to claim 1 and a dispersant, binder and/or printing oil.

16. A method of making an article which is an unfired or fired brick, unfired or fired earthenware, unfired or fired ceramicware or a ceramic glaze, wherein the article is prepared by firing it to a temperature above 1000° C., wherein, before firing, a pigment/frit mixture according to claim 1 is incorporated into a composition used to prepare the article.

17. The method of claim 16, wherein the article is a decorative tile.

18. The method of claim 16, wherein the article is a porcelain glaze.

19. The pigment/frit mixture according to claim 1, wherein the Al$_2$O$_3$ content in the frit is ≥7% by weight based on the weight of the frit.

* * * * *